(12) United States Patent
Nelson

(10) Patent No.: US 9,507,865 B2
(45) Date of Patent: *Nov. 29, 2016

(54) INTELLIGENCE CENTERS

(71) Applicant: Callidus Software, Inc., Pleasanton, CA (US)

(72) Inventor: Craig Nelson, Prior Lake, MN (US)

(73) Assignee: CALLIDUS SOFTWARE INC., Dublin, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/503,281

(22) Filed: Sep. 30, 2014

(65) Prior Publication Data

US 2015/0019526 A1 Jan. 15, 2015

Related U.S. Application Data

(63) Continuation of application No. 13/225,051, filed on Sep. 2, 2011, now Pat. No. 8,930,412, which is a continuation of application No. 12/839,865, filed on Jul. 20, 2010, now Pat. No. 8,046,387, which is a continuation of application No. 11/145,750, filed on Jun. 6, 2005, now Pat. No. 7,774,378.

(60) Provisional application No. 60/577,357, filed on Jun. 4, 2004.

(51) Int. Cl.
*G06F 17/30* (2006.01)
(52) U.S. Cl.
CPC ..... *G06F 17/30867* (2013.01); *G06F 17/3089* (2013.01)
(58) Field of Classification Search
CPC .................. G06F 17/308967; G06F 17/3089
See application file for complete search history.

(56) References Cited

U.S. PATENT DOCUMENTS

| | | | | |
|---|---|---|---|---|
| 6,430,164 B1* | 8/2002 | Jones | .................... | H04L 29/06 370/313 |
| 7,062,511 B1* | 6/2006 | Poulsen | ............ | G06F 17/30873 |
| 7,367,014 B2* | 4/2008 | Griffin | .............. | G06F 17/30581 707/E17.118 |
| 7,475,346 B1* | 1/2009 | Bullock | .............. | G06F 17/3089 709/203 |
| 2002/0052954 A1* | 5/2002 | Polizzi | .............. | G06F 17/30873 709/225 |
| 2002/0123957 A1* | 9/2002 | Notarius | ................ | G06Q 30/06 705/37 |
| 2002/0169858 A1* | 11/2002 | Bellinger | .............. | H04L 41/046 709/220 |
| 2004/0177148 A1* | 9/2004 | Tsimelzon, Jr. | .. | G06F 17/30905 709/227 |
| 2005/0097180 A1* | 5/2005 | Abdelhak | ......... | G06F 17/30873 709/208 |

* cited by examiner

*Primary Examiner* — Tarek Chbouki
(74) *Attorney, Agent, or Firm* — Duane Morris LLP; Amir Tabarrok

(57) ABSTRACT

Disclosed herein, among other things, is a system comprising a content repository, a communication portal developer, a content manager, and an analytic engine. The content repository is adapted to store electronic content in a computer-readable storage medium. The communication portal developer includes at least one wizard to create a plurality of customizable portals without coding software. Each customizable portal is accessible to one or more selected visitors through a web browser. The content manager is adapted to publish selectable electronic content to selectable portals. The content manager includes at least one wizard to populate and manage the electronic content within the content repository. The analytic engine analyzes electronic content use and visitor behavior while logged into their customizable portal. In various embodiments, the analytics are provided in real time or near real time. Other embodiments are disclosed herein.

13 Claims, 13 Drawing Sheets

INTELLIGENCE CENTERS

CROSS REFERENCE TO RELATED APPLICATION

This application is a Continuation of U.S. patent application Ser. No. 13/225,051, filed Sep. 2, 2011, which is a Continuation of U.S. patent application Ser. No. 12/839,865, filed Jul. 20, 2010, now U.S. Pat. No. 8,046,387, which is a Continuation of U.S. patent application Ser. No. 11/145,750, filed Jun. 6, 2005, now U.S. Pat. No. 7,774,378, which claims the benefit of priority of U.S. Provisional Application Ser. No. 60/577,357 entitled "System and Method for Providing a Marketing and Sales Intelligence Center," filed Jun. 4, 2004, under 35 U.S.C. 119(e), which applications are incorporated herein by reference in their entirety.

TECHNICAL FIELD

This disclosure relates generally to software and, more particularly, to systems, devices and methods for providing intelligence centers.

BACKGROUND

Useful and desired information can be easily lost within large quantities of available data. Much of the available data can quickly become obsolete in a fast-changing environment, or is not directly on point. Various document management, content management or knowledge management engines are used to manage information. Useful information is able to be timely accessed and shared with others.

Customized and private communication channels used to share customized information often require relatively complex communication and database programming, or otherwise require technical assistance. Such requirements are obstacles to quickly share information in fast-changing environments.

One example of useful information is customer information. Various customer relationship management (CRM) software are used to track customer information and audit sales opportunities. However, CRM software lacks, among other things, business logic and templates.

SUMMARY

One aspect of this disclosure relates to a system. Various system embodiments include a content repository, a communication portal developer, a content manager, and an analytic engine. The content repository is adapted to store electronic content in a computer-readable storage medium. The communication portal developer includes at least one wizard to create a plurality of customizable portals without coding software. Each customizable portal is accessible to one or more selected visitors through a web browser. The content manager is adapted to publish selectable electronic content to selectable portals. The content manager includes at least one wizard to populate and manage the electronic content within the content repository. The analytic engine analyzes electronic content use and visitor behavior while logged into their customizable portal. In various embodiments, the analytics are provided in real time or near real time.

Various system embodiments include means for populating and managing electronic content in a content repository using programming wizards, means for creating customizable communication portals without coding software using programming wizards, means for publishing selectable electronic content within the content repository to selectable portals, and means for analyzing electronic content use and portal use. Each communication portal is customized to provide a portal for at least one specific user. Each specific user is associated with the portal to which the electronic content was published is able to access the published electronic content within the content repository through the portal.

One aspect of this disclosure relates to a method. According to various embodiments, electronic content in a content repository is populated and managed using programming wizards. Customizable communication portals are created without coding software using programming wizards. Each communication portal is customized to provide a portal for at least one specific user. Selectable electronic content within the content repository is published to selectable portals. Each specific user associated with the portal to which the electronic content was published is able to access the published electronic content within the content repository through the portal. Content use and portal use is analyzed.

One aspect of this disclosure relates to a method for creating a portal through a user interface with a communication portal developer. According to various embodiments, an owner of the portal is selected from a list of potential owners provided by the interface. An audience for the portal is selected from a list of potential audiences provided by the interface. Electronic content from a content repository and users are added to the portal.

One aspect of this disclosure relates to a computer system. Various system embodiments include a content repository and a communication portal developer used to develop customized portals. The content repository is adapted to store electronic content in a computer-readable medium. The communication portal developer includes a portal owner interface, an audience interface, a portal content interface, and a portal user interface. The portal owner interface provides a list of potential owners and enables selection of a portal owner from the list of potential owners. The audience interface provides a list of potential audiences and enables selection of an audience from the list of potential audiences. The portal content interface provides a list of potential electronic content stored in the content repository that can potentially be accessed through the portal. The portal content interface enables selection of portal content from the list of potential electronic contents to allow one or more portal users to access the selected content through the portal.

This Summary is an overview of some of the teachings of the present application and not intended to be an exclusive or exhaustive treatment of the present subject matter. Further details are found in the detailed description and appended claims. Other aspects will be apparent to persons skilled in the art upon reading and understanding the following detailed description and viewing the drawings that form a part thereof, each of which are not to be taken in a limiting sense. The scope of the present invention is defined by the appended claims and their legal equivalents.

DETAILED DESCRIPTION

Figure 1:
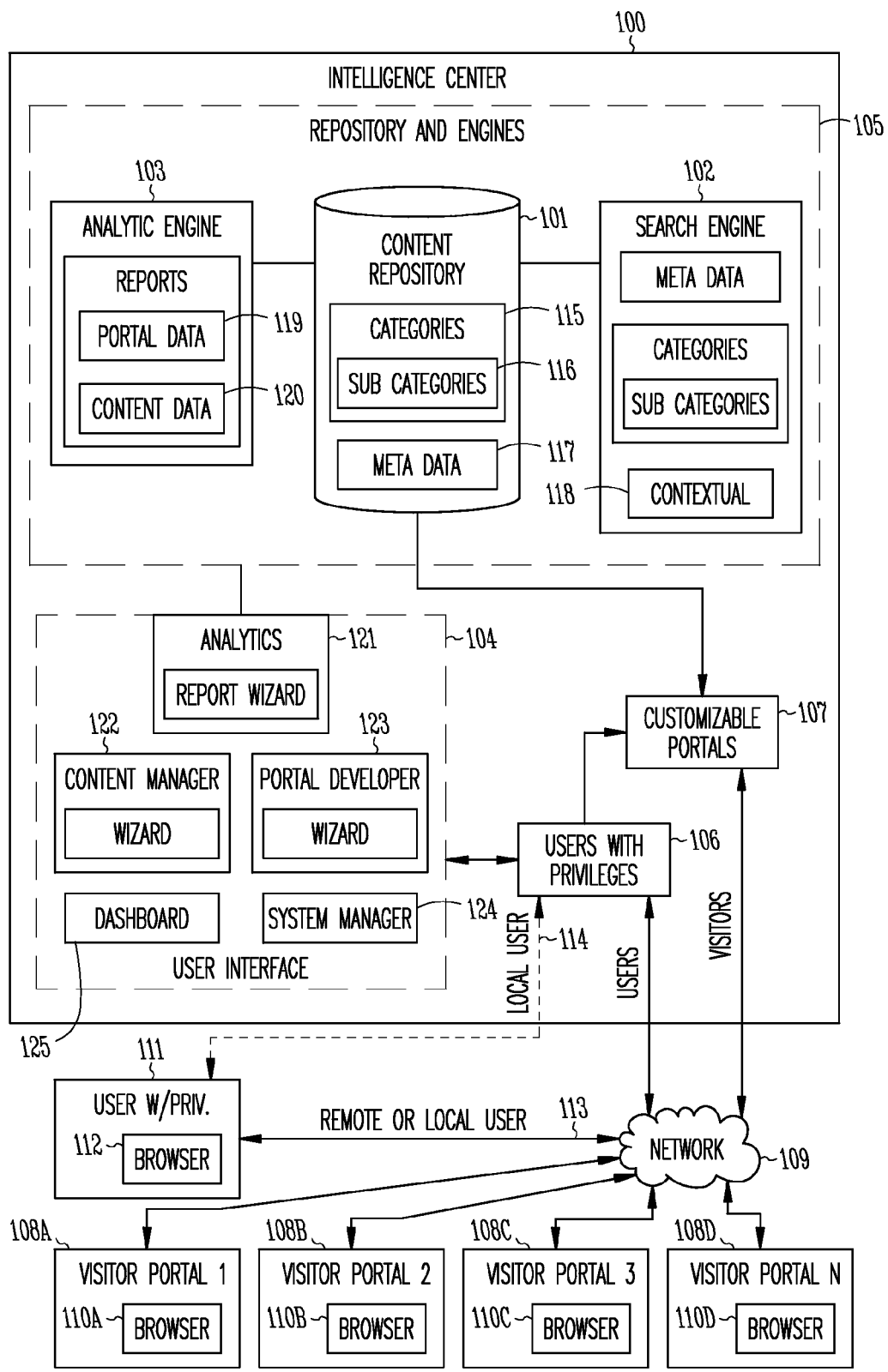
FIG. 1 illustrates an embodiment of system to provide an intelligence center.

The following detailed description of the present subject matter refers to the accompanying drawings which show, by way of illustration, specific aspects and embodiments in which the present subject matter may be practiced. These embodiments are described in sufficient detail to enable those skilled in the art to practice the present subject matter. Other embodiments may be utilized and structural, logical, and electrical changes may be made without departing from the scope of the present subject matter. References to "an", "one", or "various" embodiments in this disclosure are not necessarily to the same embodiment, and such references contemplate more than one embodiment. The following detailed description is, therefore, not to be taken in a limiting sense, and the scope is defined only by the appended claims, along with the full scope of legal equivalents to which such claims are entitled.

Various aspects and embodiments of the present subject matter provide hosted intelligence centers that enable dynamic information delivery. Embodiments of the present subject matter are delivered as an ASP (active server pages) hosted solution that can be leased and can be accessed through a web browser. No additional hardware or software is required.

Various embodiments of the present subject matter adapt to a business without development. The intelligence center is branded for each customer using a template driven approach. Each customer deployment takes on the look and feel of the companies branding. Some embodiments scrape a customer's existing website, also referred to as a dot com site, to obtain font type, font size, font color, graphics, background, button types, and the like, to automatically develop a skin that matches the customer's brand.

Various embodiments of the present subject matter adapt to individual user needs. The intelligence center adapts to the unique needs of each user. This is accomplished without development using templates and includes dynamic delivery of files, news, reporting, usage, and other repository values.

Various embodiments of the present subject matter provide advanced search features and functions. A search engine filter combined with a hierarchical interface display is used to locate content. This provides the user with the ability to search through thousands of documents contained in the repository based on metadata tags for each of the document to locate matches. An advanced search engine returns matches based the customer's products and method of doing business. Content can be searched based on the profile of an opportunity. Data shaping and other advanced SQL techniques can be used to quickly return content.

Various embodiments of the present subject matter provide portal creation without development. The portal creation wizard allows users to create online web portals in several mouse clicks without application development effort using HTML or other programming language. Each portal delivers dynamic content to users over the internet and provides a vendor with the ability to understand the portal user's behavior real-time.

Various embodiments of the present subject matter provide advanced content management. Users are able to submit, publish, maintain, and retire content using the automated web application. The repository is self grooming sending alerts to content authors when content is near to retirement and provides feedback from users of content.

Various embodiments of the present subject matter provide guided selling. The guided selling feature returns content contained in the repository based on the customer's profile. It displays this in the context of the customer's selling process. Various embodiments of the present subject matter provide real-time, or near real-time, analytics. Real-time analytics to understand the usage of the application and the content is provided as a by-product of users accessing the intelligence center. The analytics can be tracked at a user, division, and country level. Advanced SQL accessing techniques can quickly display results.

Various embodiments of the present subject matter provide an on-line resource center, which provides a facility that allows users to build an intranet without application development effort. Each page is dynamic displaying only content that is assigned to the user's division.

The intelligence center is a hosted product suite that is designed to be customized without development effort. As a hosted solution no hardware needs to be bought, no software needs to be installed and only a quick setup wizard is completed. The intelligence center is easily branded to look like an end user's intranet and Internet sites and, by using a rapid deployment approach, takes less than 8 hours to rollout.

FIG. 1 illustrates an embodiment of system to provide an intelligence center. The illustrated intelligence center 100 includes a content repository 101, search engine 102, and analytic engine 103. The illustrated intelligence center further includes a user interfaces 104 to appropriately access the content repository, search engine and analytic engine, which are grouped together for simplicity as Repository and Engines 105. The illustrated intelligence center further includes port(s) 106 for users with privileges to access corresponding user interfaces 104, and customizable portals 107. The customizable portals 107 function as private web-sites to view and publish content selected specific for the portal and to collaborate with other visitors of the customizable portal.

The illustration further includes visitor 108A who accesses portal 1 through network 109 using browser 110A, visitor 108B who accesses portal 2 through network 109 using browser 110B, visitor 108C who accesses portal 3 through network 109 using browser 110B, visitor 108D who accesses portal N through network 109 using browser 110D. Each portal can be customized to allow one or more specific visitors. The illustration also includes a user 111 with privileges who accesses the user interfaces 104 and the customizable portal(s) 107. A remote user can access the intelligence center via a global communication network, as illustrated at 113, and a local user can access the intelligence center through a local network, as illustrated at 114, or a global network, as illustrated at 113. User accounts provide access to the product, and dictate the level of control that the logged-on user has. According to various embodiments, a user account falls within one of the following groups: Visitors, an externally grantable user account which enables users to view the portals to which they are assigned; Visitor Administrators, an externally grantable user account which enables users to view and administer the portals to which they are assigned, Publishers, which enables users to publish content to the repository, and therefore also to private websites, and to administer Visitor and Visitor Administration accounts, Administrators, which enables users to publish content and administer all user accounts and product settings, and Super Users, which is a special group for staff members.

A brief introduction of the system components is provided here. Further detail is provided throughout this specification. The content stored in the content repository is electronic content, which is capable of being stored in electronic form on a computer-readable medium. Each content item is stored once, and is capable of being associated with at least one portal. The electronic content can be organized by associating each content item with categories 115, sub categories 116, sub-subcategories, and the like. Additionally, metadata 117 can be associated with each content item to assist with searching functions. The search engine 102 is adapted to search by metadata, and/or categories, subcategories, which corresponds to the categories and metadata associated to the content within the content repository. Contextual searches 118, such as solution based searches, can be performed using the metadata. The analytic engine is adapted to generated selectable reports, including reports regarding portal specific data 119, such as who is using the portal and when and how the portal is being used, and regarding content data 120 such as how often the content is used. This information can be provided in real time or near real time, i.e. without noticeable delay to the user.

The illustrated user interfaces 104 include an analytics interface 121, with a table-driven report wizard, used to select and customize desired reports. The illustrated content manager interface 122 includes a table-driven wizard used to manage and groom the content in the content repository. The illustrated portal developer interface 123 includes a table-driven wizard used to create and customize communication portals. The system manager interface 124 is used to control the functionality of the intelligence center, and the dashboard interface 125 provides an interface for a user to view and gain access to often-used information, such as portal information, electronic content use and visitor behavior, and email communication.

The system manager 124 allows staff to quickly and easily setup the intelligence center to support a business without the need to perform customized application development. The system manager is used to adapt the intelligence center to adhere to a company's processes, products, competitors, industries serviced, and collateral content types. In addition, the color scheme and overall look and feel can be changed to adhere to intranet or extranet sites. This component uses step-by-step wizards to ensure quick setup and to enable content publishing, even on the same day on which the intelligence center is installed.

The content manager 122 allows those that manage content to fine-tune and continue to grow content such as marketing collateral, sales presentations and training material in real-time mode. Content is made available immediately with targeted communication emails to ensure that content is used. To prevent outdated content, the content repository automatically grooms the materials based on rules defined by staff responsible for content management. The entire content management process is automated, allowing a user to simply review, approve, and maintain content using a step-by-step approach. Content is posted, archived, and removed from the content repository without the help of IT or native HTML development. The content manager includes a basic set of collateral templates used to quickly populate consistent content.

A user component allows staff to have direct access to the latest collateral, sales presentations, and training material for their specific target user audience, be it employees, customers, channels sales or partners. The user component also enables staff to have direct feedback to document owners, allowing them to have a hand in the fine-tuning of documents. Users have access to the latest content with the ability to email, download, and package content for customers. The user component also fosters collaboration allowing the user to interact with content owners, share feedback, post customer wins, and submit new best practice content. The My Solution feature allows a user to quickly access content that they frequently leverage.

A well-known problem with many intranets and extranets is outdated content. All content published to the content repository 101 has an expiration date. Using email, content owners receive notification of content in need of review. The owner can update and extend the content or simply allow it to be archived.

The intelligence center provides a web-based, database-driven application that provides a centralized framework for managing collateral and information, and an online library with a search engine. The intelligence center deploys easily and, using built-in setup wizards, content templates and reports, adapts to meet business needs without having to build custom code. Two-way communications through customizable portals allows both input and feedback between teams. Unused content is managed through the application of "usage thresholds" If a document is not being used by the field (failing to exceed a threshold of minimal unique hits), then the owner will be notified; they can either promote and extend the content, or allow it to be archived. Archived content may be easily searched by users, but is removed from the main "workspace".

Figure 2:
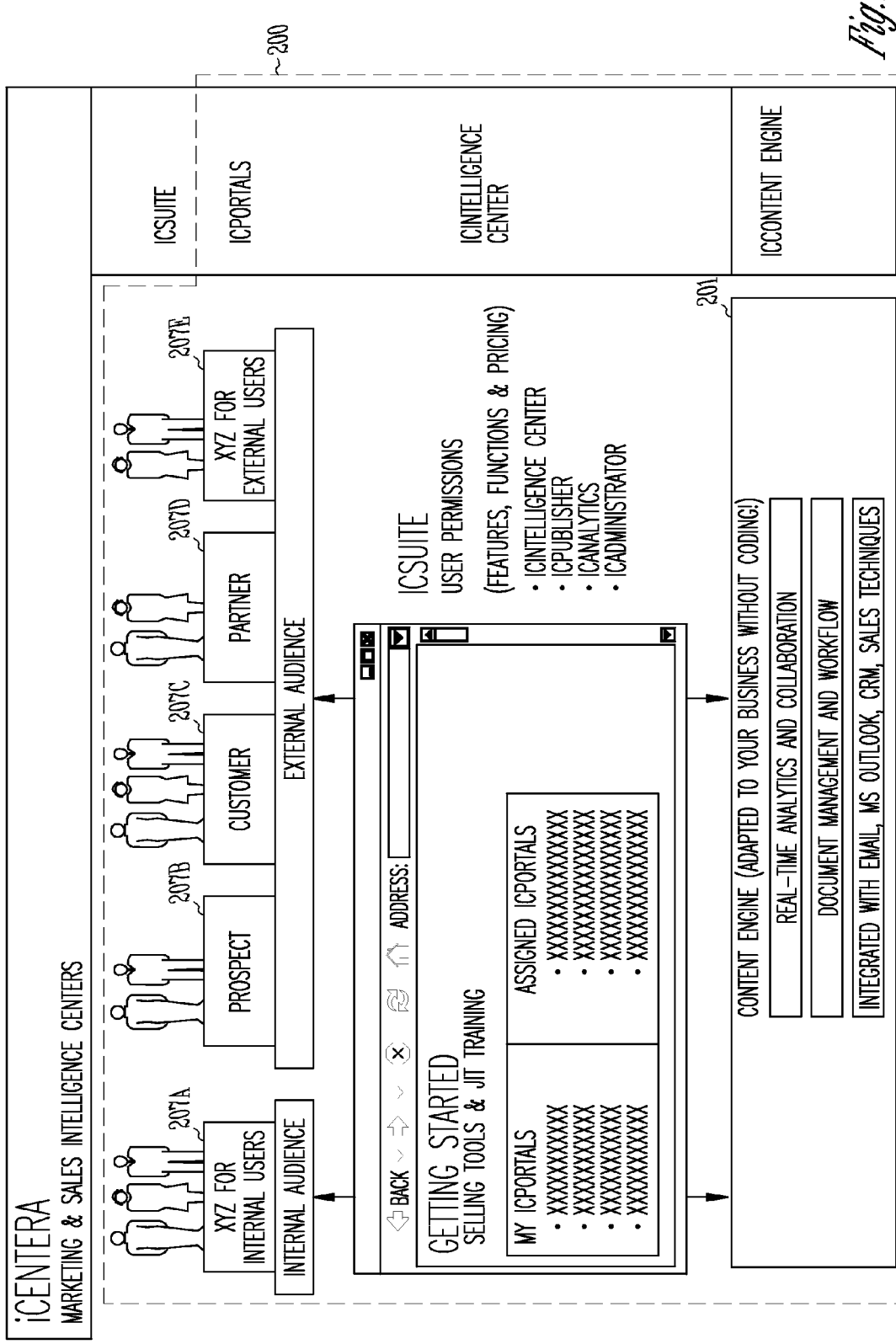
FIG. 2 illustrates an embodiment of a system to provide a marketing and sales intelligence center.

FIG. 2 illustrates an embodiment of a system to provide a marketing and sales intelligence center. The illustrated system 200 illustrates that the system includes customizable portals 207 A-E, capable of being created and customized for an internal audience (along with subsets of internal audiences such as various management positions, for example), and external audiences such as prospects, customers, partners, and external users of the organization. Thus, since the creation of customized portals is quick and easy using table-driven wizards and since the content can be quickly and easily published to the newly created portals using table-driven wizards, specific content from the content engine 201 can be provided for each specific portal to meet the specific needs of the user of the portal. The content engine can ensure that relevant, updated information is published to the portals. Some information regarding content management, including a content management lifecycle, is provided below with respect to FIG. 12. As is provided in more detail below, the content engine is able to provide real time analytics and collaboration, and document management and workflow. Additionally, the content engine can be integrated with external systems such as email and CRM systems, for example.

Figure 3:
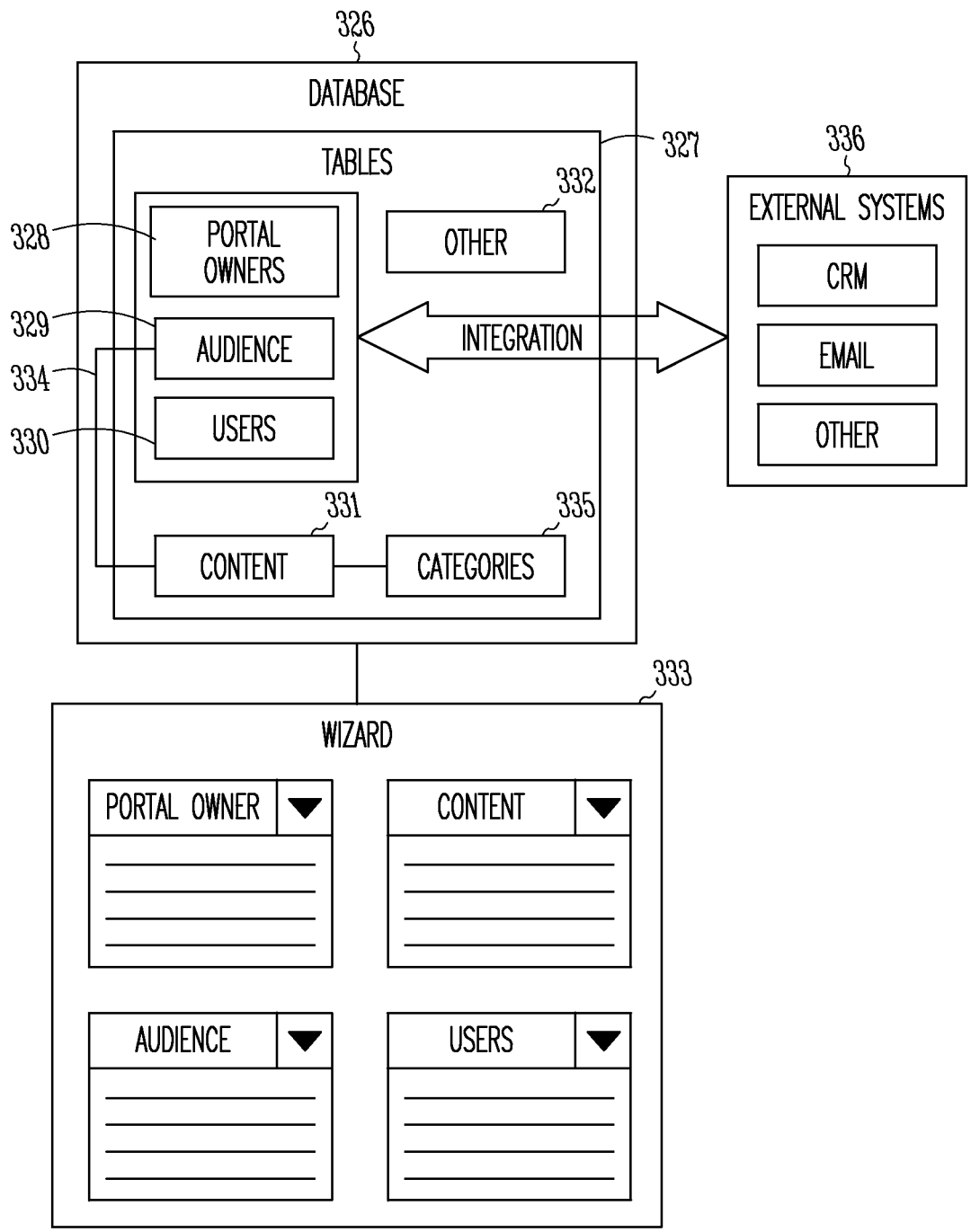
FIG. 3 illustrates, generally, an embodiment of table-driven wizard used to create customizable ports, to populate and manage electronic content within the content repository, and to publish selectable electronic content to selectable portals, for example.

FIG. 3 illustrates, generally, an embodiment of table-driven wizard used to create customizable ports, to populate and manage electronic content within the content repository, and to publish selectable electronic content to selectable portals, for example. The illustration generally includes a relational database 326, such as can be stored in the content repository. The database includes a number of tables 327. Examples of tables include available portal owners 328, available portal audiences 329, available portal users 330, available content 331 (as determined by associated content) or any other table 332. The table-driven wizard accesses the tables in the database to provide a list, and also permits the wizard user to select from the list. As illustrated generally in the figure by lines 334 and 335, the selected audience type and/or selected categories (including subcategories and sub-subcategories) can be used to limit the available content to be chosen. In some embodiments, the audience type functions as a category type. Pull-down menus are one way to select from the table. Those of ordinary skill in the art 9 will understand that other ways can be used to select from the table data. The table data can be entered into the system using forms, and stored for later use. Some embodiments integrate with external systems, such as email and CRM systems, to populate the data. The data from these systems is then available for selection.

Figure 4:
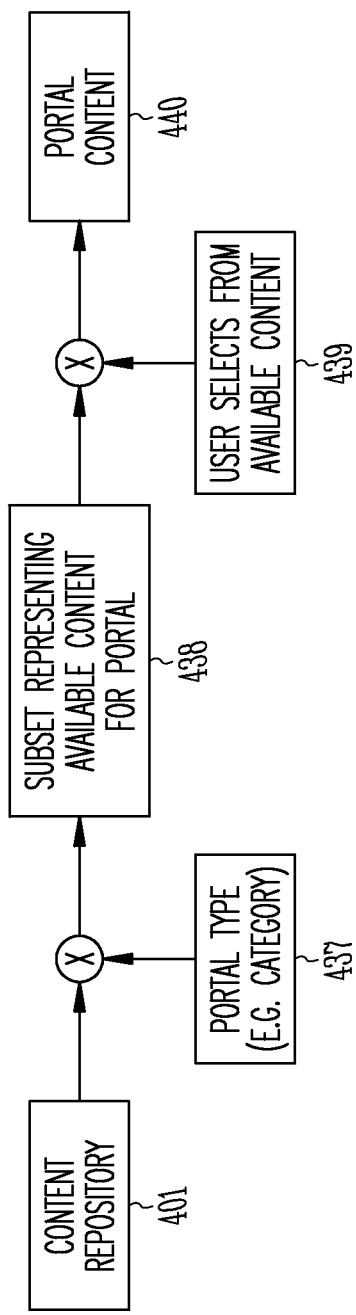
FIG. 4 illustrates an embodiment of a process to select content from a content repository for use as portal content.

FIG. 4 illustrates an embodiment of a process to select content from a content repository for use as portal content. The content repository 401 contains groomed content that is managed through a content manager, such as illustrated at 122 if FIG. 1. Thus, accurate and current content is stored in the content repository 401. When a portal is created, a portal type 437 is selected from a table of available portal types. The portal types are associated with the content in the content repository. Upon selection of a portal type, a subset 438 of the total amount of content is available for publication to the portal. The user is able to review and select 439 from this subset the content to be published to the portal. The content 440 "published" to the portal remains within the content repository. The portal provides a view or access to content. Thus, the content manager is able to continue to update or otherwise groom the content published to the portal to provide portal content. The visitor to the portal is able to download a current version through the portal. The figure illustrates a subset created by portal type. Other table-driven ways to select subsets and sub-subsets of data can be implemented.

Figure 5:
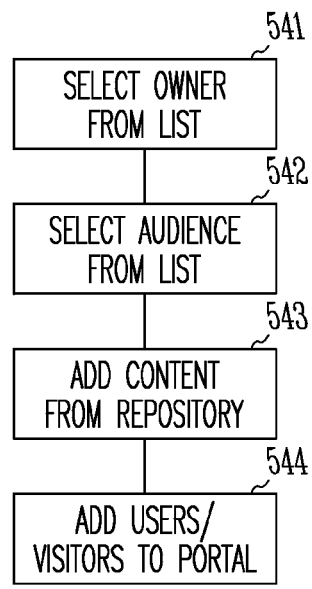
FIG. 5 illustrates an embodiment of a method for creating a portal through a user interface with a communication portal developer.

FIG. 5 illustrates an embodiment of a method for creating a portal through a user interface with a communication portal developer. At 541, an owner of the portal is selected from a list of potential owners provided by the interface. The list of owners can be stored in a database table of potential owners. At 542, an audience for the portal is selected from a list of potential audiences provided by the interface. The list of audiences can be stored in a database table of potential audiences. At 543, electronic content from a content repository is added to the portal. The portal allows a visitor to view or otherwise access the content, but the content remains stored in the content repository and is able to be groomed using the content manager. A visitor to the portal can make a copy of the content and send, store, and/or revise the copy of the content. At 544, users can be added to the portal. The users can be manually entered, can be selected from a previously stored list of potential users, or can be imported from an external contact management system such as an email system or CRM system. Adding the electronic content and the users can also be performed through a process of selection.

Figure 6:
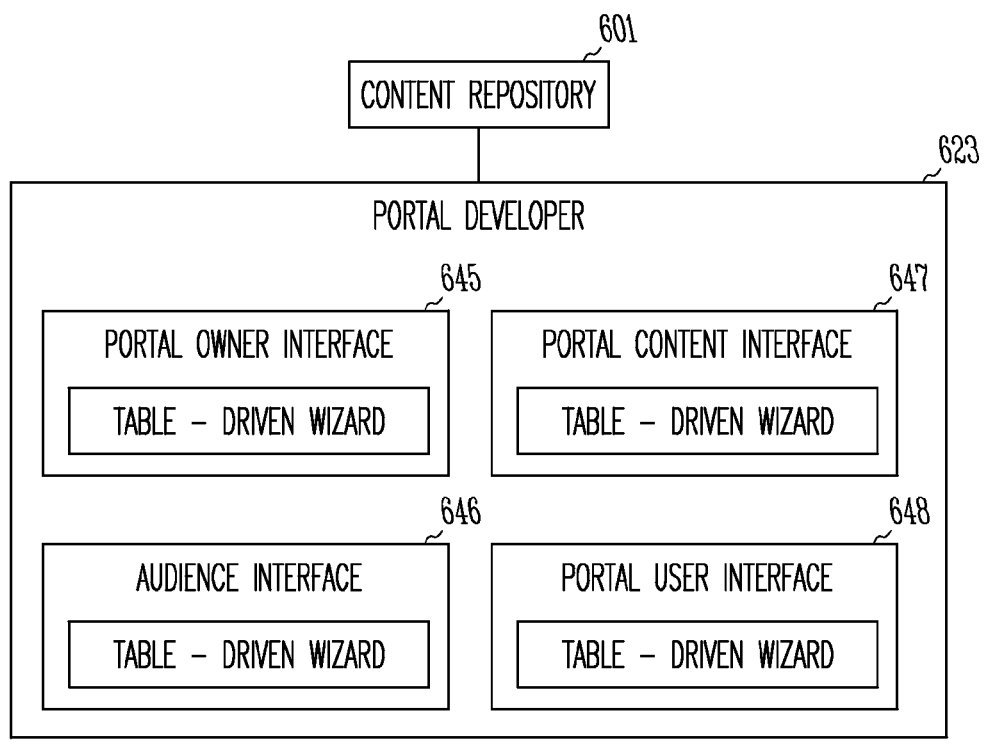
FIG. 6 illustrates an embodiment of a computer system to develop customized portals to share content.

FIG. 6 illustrates an embodiment of a computer system to develop customized portals to share content. The illustrated system includes a content repository 601 to store electronic content in a computer-readable medium, and further includes a communication portal developer 623 to develop customized portals. The developer 623 includes a portal owner interface 645 to provide a list of potential owners and to enable selection of a portal owner from the list of potential owners using a table-driven wizard. The developer 623 further includes an audience interface 646 to provide a list of potential audiences and to enable selection of an audience from the list of potential audiences using a table-driven wizard. The illustrated developer 623 further includes a portal content interface 647 to provide a list of potential electronic content stored in the content repository and accessible through the portal. A table-driven wizard enables selection of portal content from the list of potential electronic contents. A portal user interface 648 is used to add one or more visitors to the portal. The visitors, or users, can be added using a table-driven wizard.

Example

Hosted Marketing and Sales Intelligence Center

Examples of specific implementations of the hosted intelligence center includes hosted marketing and sales intelligence center, hosted health care intelligence centers, and hosted real estate intelligence centers. The marketing and sales intelligence center is illustrated in this document as an example of an implementation. Those of ordinary skill in the art will understand, upon reading and comprehending this disclosure, how to implement the intelligence center into other industries, such as, by way of example and not limitation, health care and real estate. Thus, unless otherwise recited in the claims, the claims should not be limited to a particular application within particular industry.

The marketing and sales intelligence center, according to various embodiments of the present subject matter, provides the ability to easily manage, find, deliver, and communicate information to sell more effectively. The marketing and sales intelligence center provides an environment that delivers useful, on-demand, customizable and actionable information to sales teams, partners, and customers using customizable portals for customers, prospects and partners. The marketing and sale intelligence center serves as a central repository of knowledge used to drive revenue with new and existing customers and to maintain synchronization for all sales channels and those that enable sales.

The hosted marketing and sales intelligence center enables marketing to effectively launch new products including "sales ready" collateral that works for all sales channels to bridge the gap between marketing and sales, enables marketing programs that are in sync with the needs of customers and prospects to bridge the gap marketing and current market needs, and enables real-time feedback to evolve the value proposition, competitor intelligence, and product requirements. The hosted marketing and sales intelligence center provides a personal website through a customizable portal to enable the customer to understand the value proposition based on their needs and continue to stay current on the solutions available for add-on sales. Best practices can be shared across the entire organization using consistent material and prior successes to quicken the time to ramp-up new staff. Real-time, or near real-time, analytics continuously provides a way to measure and improve the overall effectiveness of marketing, sales, services, and other groups involved in selling, supporting sales, or supporting the customer. Because of the real-time or near real-time analytics, there is no perceived delay in receiving the data because the data is processed when it enters the computer rather than by some sort of batch processing where the information is stored and operated on at a later time.

According to various embodiments, the present subject matter provides an enterprise solution for a revenue enablement lifecycle, including a new produce release, marketing/sales programs and education, sales effectiveness, service effectiveness, and best practices and analytics. The entire lifecycle has at its core a repository of content stored in the customer's private website. Within minutes a private, customized website for the customer can be generated by the present subject matter.

New Product Release

Problems associated with conventional new product releases include the lack of consistent release process, the lack of common collateral, and the lack of a vehicle to launch new product to enable all sales channels to learn the value proposition. There is no automation or vehicle to drive the necessary collaboration to create and evolve the message and provide field proven best practices, no clear understanding of the enablement needs for each sales channel resulting in generic material, and no clear understanding of the product priority, revenue goals, what target sales channels need enablement. The time between the release of a new product and the effective selling across all channels is too long, such that products "die on the vine". Training programs are costly and ineffective taking people away from selling time. Features are sold over value, which leads to discounting, increasing the loss rate to competition along with poor forecasting and revenue visibility.

With respect to new product releases, the present subject matter can be used to drive collaboration through the enterprise to produce consistent and effective sales training. A combination of product, sales collateral, and training materials are produced to effectively release a new product. This content ensures that direct sales, channel sales, partners, and customers quickly understand the value proposition and product. The present subject matter can provide a standard process and vehicle to distribute new content used to enable all sales channels to learn and evolve the value proposition. Using the present subject matter, a new product release process focuses on connecting the value proposition to the needs of the customer base to quickly identify new sales opportunities, and provides consistent sales collateral and training content including sales/training kits and solution oriented packing. Training is delivered "just-in-time" as the various sales channel work the opportunity.

Figure 7:
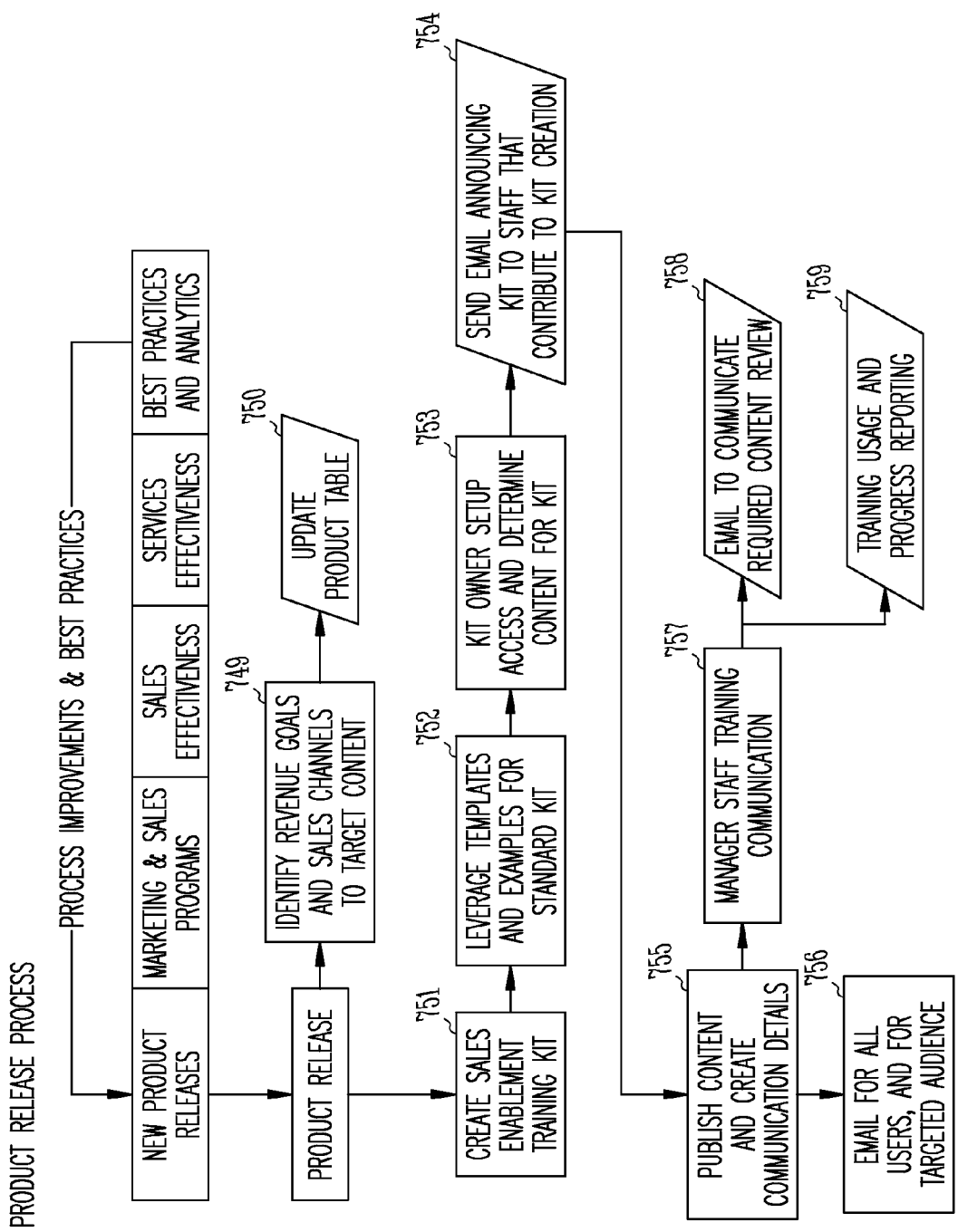
FIG. 7 illustrates a new product release process, according to various embodiments.

FIG. 7 illustrates a new product release process, according to various embodiments. The kit builder functionality is used as collaboration tool to drive the creation of content that is used by each of the kit types. Upon the release of a product "sales ready" collateral with imbedded training is provide to quickly gain traction is the sale of the new release. As illustrated in FIG. 7, the revenue goals and sales channels target customers are identified at 749, and the product database tables are updated at 750. A sales enablement training kit is created at 751, using templates and examples as leverage, as illustrated at 752. The owner and kit content is determined at 753, and at 754 a message (e.g. email) is sent requesting contributions. Content is published and communication details are created at 755, and an email announcing the kit is generated for all users and the targeted audience at 756. Communication is sent for management staff training 757 and for required content review 758, and reports are generated 759 for training usage and progress.

Marketing and Sales Programs

Problems associated with conventional marketing and sales programs include a gap between what sales needs and what marketing provides, the inability to timely process the constantly evolving products and positioning, re-training of new and existing product value proposition and tech product training such as may occur because of mergers and acquisitions, an inconsistent message across all channels, poor communications between sales channels and customers. Additionally, the materials are not value based. Because of these problems, collateral needs to be reworked taking away from selling time and working with customers. The creation and re-distribution of collateral is costly. Customers tend to become confused due to inconsistent messages from multiple channels. Poor communication between sales channels and customers decreases reaction time to minor shifts and major strategic inflection points. Products are not in line with market needs because focus on requirements is lost. Discounting is required to create sense of urgency to buy rather than selling business value reducing revenue.

With respect to new product releases, the present subject matter can be used to provide a collaboration engine and standard processes to enable the introduction of new products to the market quicker. Marketing campaigns can be aligned to real needs in the market. A single repository provides one central point to update, and content can be used by all channels. The present subject matter can provide a vehicle for just-in-time training, and can provide analytics against central content with usage information and content feedback to allow a user to detect trends in marketing, sales, and product. The present subject matter can be used to provide targeted content to provide sale programs and marketing campaigns inline with market needs. Mindshare is gained across sales channels and customer base to take advantage of the new product release. Marketing programs and pre-packaged solutions are developed that are aligned to real customer needs in order to inform and motivate the customer. The present subject matter provides the necessary tools to enable "just-in-time" (JIT) training across your sales channels and customer base.

Figure 8:
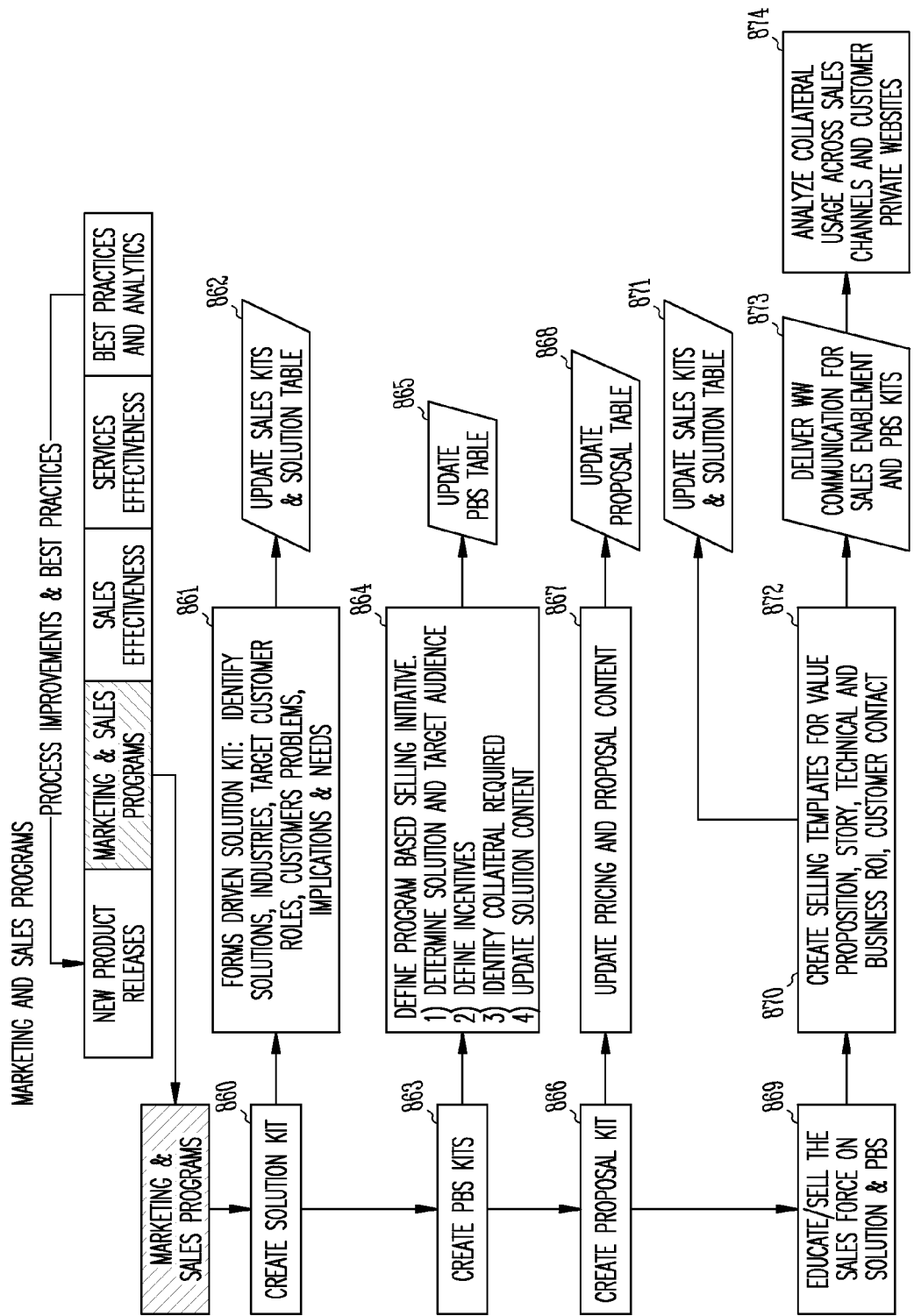
FIG. 8 illustrates a marking and sales programs workflow, according to various embodiments.

FIG. 8 illustrates a marking and sales programs workflow, according to various embodiments. The approach ensures that one standard message is delivered to all sales channels and that sales targets specific customer needs and pain points. Solution kits are created at 860. For forms driven (also referred to herein as table-driven wizard) solution kits, identify the solutions, industries target customer roles, customer problems, implications and needs, at 861, and update the database tables at 862. A Program Based Selling kit is created at 863, where the programmed based selling initiative is defined at 864 including determining audience, incentives and required collateral and updating solution content, and the tables are updated at 865. Proposal kits are created at 866, wherein the pricing and proposal content are updated at 867 and the tables are updated at 868. The sales force is educated and sold on the solution and the program based selling at 869, where selling templates are created at 870, tables are updated at 871, communication is delivered at 872 and the collateral usage is analyzed at 873.

Sales Effectiveness

Problems associated with conventional sales include discounting to advance and close the deal rather than building value. Current tools track account and customer information and audit the marketing and sales process, but do not address how to enable sales or how to understand and sell product. Poor communication can be attributed to artificial walls between development, marketing, and sales channels. These problems result in poor forecasting and loss of revenue, ineffective sales channels, and unused sales collateral.

With respect to sales effectiveness, the present subject matter can be used to bridge the gap between marketing and sale to sell value to the customer. After formal training is delivered, sales channels are dependent on selling tools and collateral. The present subject matter serves as the vehicle to deliver "sales ready" collateral packaged with just-in-time training material to enable sales channels to quickly identify opportunities and sell value. The present subject matter can provide online sales coaching, can improve the effectiveness of CRM and other productivity tools by providing an outline regarding how to sell. Sales kits are aligned to real customer needs and evolves based on feedback and content analytics. Embodiments of the present subject matter provide private customer websites with content that is aligned to their needs.

Figure 9A:
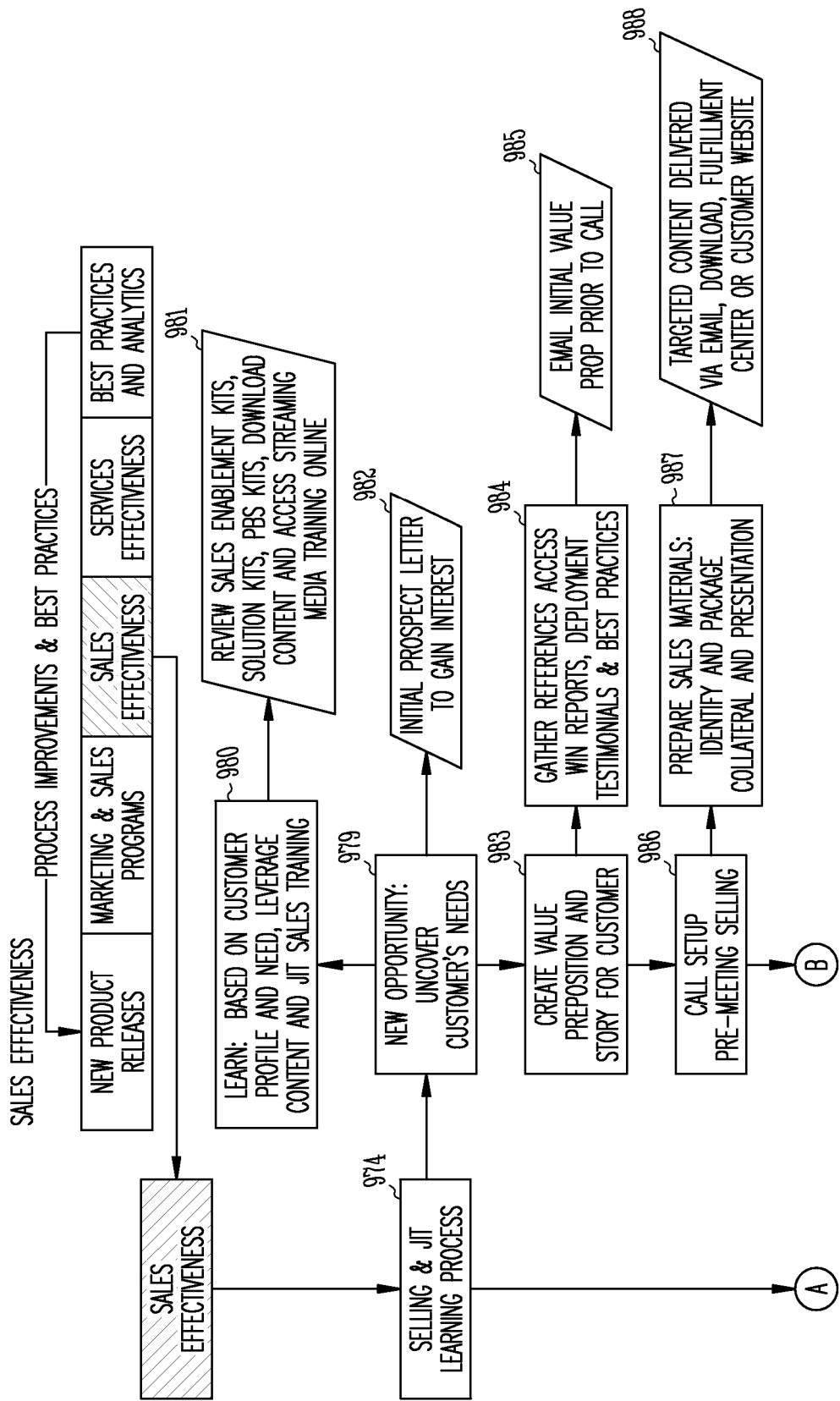
FIGS. 9A-B illustrate a marking and sales programs workflow, according to various embodiments.
Figure 9B:
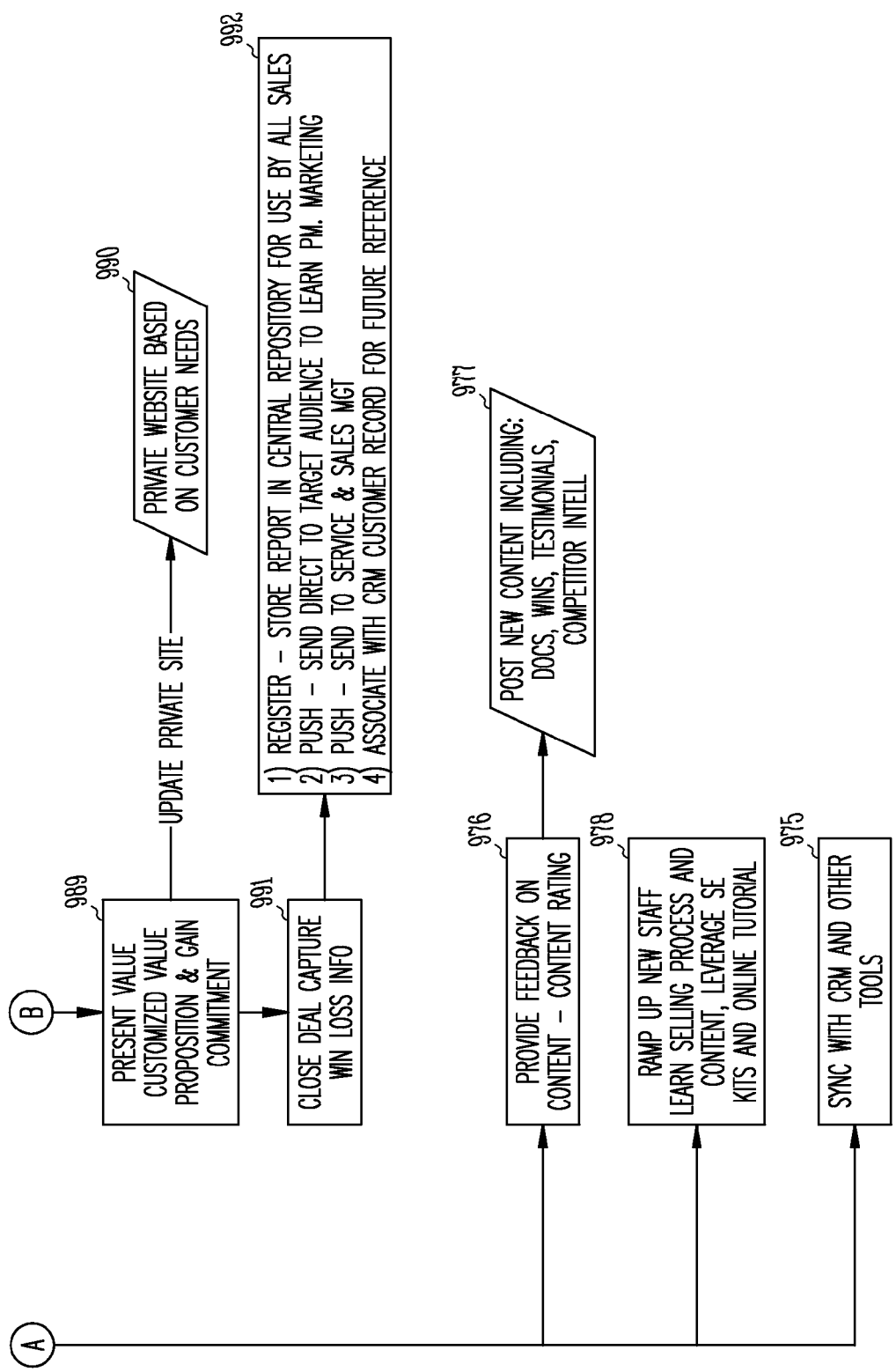

FIGS. 9A-B illustrate a marking and sales programs workflow, according to various embodiments. A selling and just-in-time learning process is illustrated at 974, and system can be synchronized at 975 with CRM and other tools. Feedback on content is provided at 976 and new content is posted at 977. New staff is ramped up using collateral at 978. For a new opportunity, as illustrated at 979, a customer's needs are uncovered. In an effort to learn, content and training are leveraged based on profile and need 980, and collateral is reviewed 981. An initial letter is generated to prospect at 982. A value proposition and story is created for the customer at 983, references are gathered at 984 and communication (email) is provided to deliver initial proposition 985. Pre-meeting selling 986 involves preparing sales materials 987 and delivering targeted content 988 through a desired vehicle (email, download, etc.). Value is presented at 989, and the private website (portal) is updated based on the customer's needs 990. The deal is closed at 991, and the results are captured and appropriately disseminated at 992

Services Effectiveness

Problems associated with conventional sales include the lack of consistent messaging between pre-sales and post-sales teams, as the pre-sales teams do not share the perceived value for why the customer purchased the product with post sales staff that handles the customer, and the post-sales teams do not communicate the actual value received to pre sales account owners. Additionally, post-sales teams are unable to identify and pass additional sales information to presales teams. These problems result in improperly set expectations, implementations that do not meet expectations, the inability to leverage real customer testimonials for new sales, and reduced add-on sales after initial sale.

With respect to services effectiveness, the present subject matter can be used to bridge the gap between pre and post sales to share best practices and capture deployment successes. After the sale has occurred, an organization should effectively transition to deployment mode maintaining the knowledge and best practices specific to each new customer. The present subject matter provides a central knowledge base to maintain the customer's best practices online. The central location allows standard files such as power point presentations as well as rich media to be shared. Win reports captured and shared with service staff include statement of work or other additional supporting information. The service process leverages new customer information extending the customer's private website for collection and distribution of content. This is part of the re-selling process ensuring a smooth transition from pre to post sales.

Figure 10:
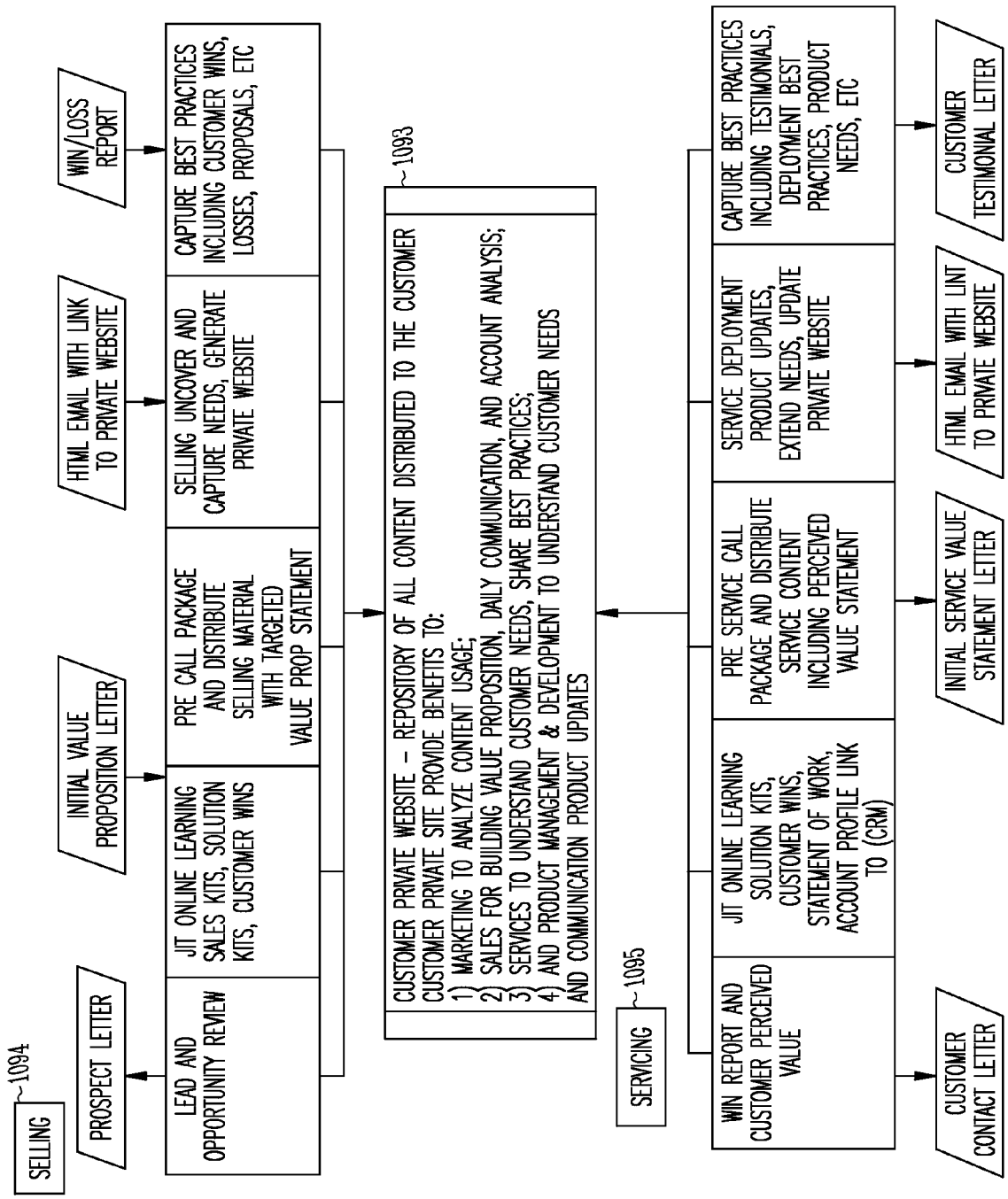
FIG. 10 illustrates a customer selling, servicing and re-selling process, according to various embodiments.

FIG. 10 illustrates a customer selling, servicing and re-selling process, according to various embodiments. The customized portal 1093 (customer's private website) includes a repository of all content distributed to the customer, including both selling 1094 and servicing 1095. This benefits marketing to analyze content usage, sales to build value proposition, communicate, and analyze account, services to understand customer needs and to share best practices, and product management and development to understand customer needs and to communicate product updates.

Figure 11A:
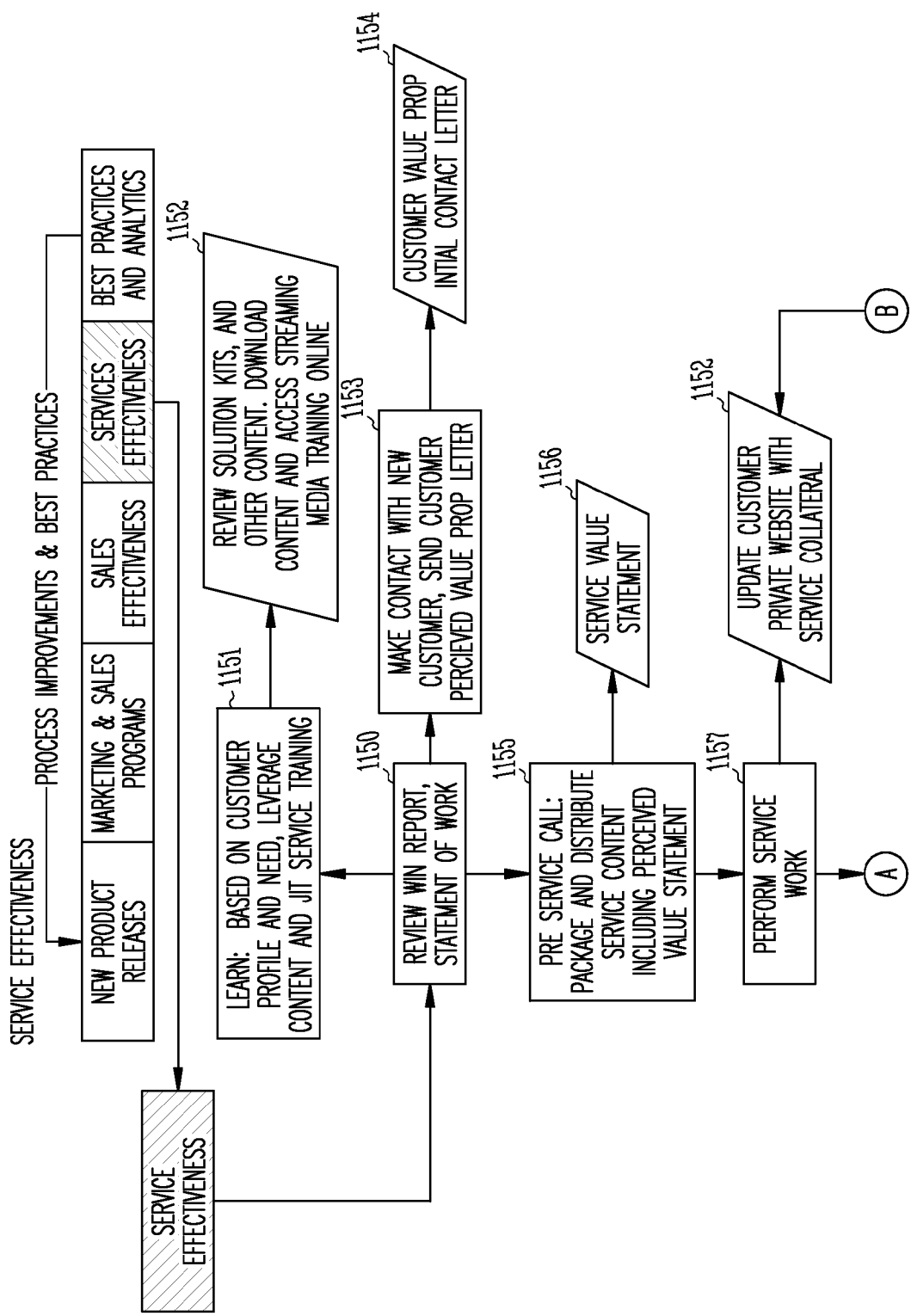
FIGS. 11A-B illustrate services effectiveness workflow, according to various embodiments.
Figure 11B:
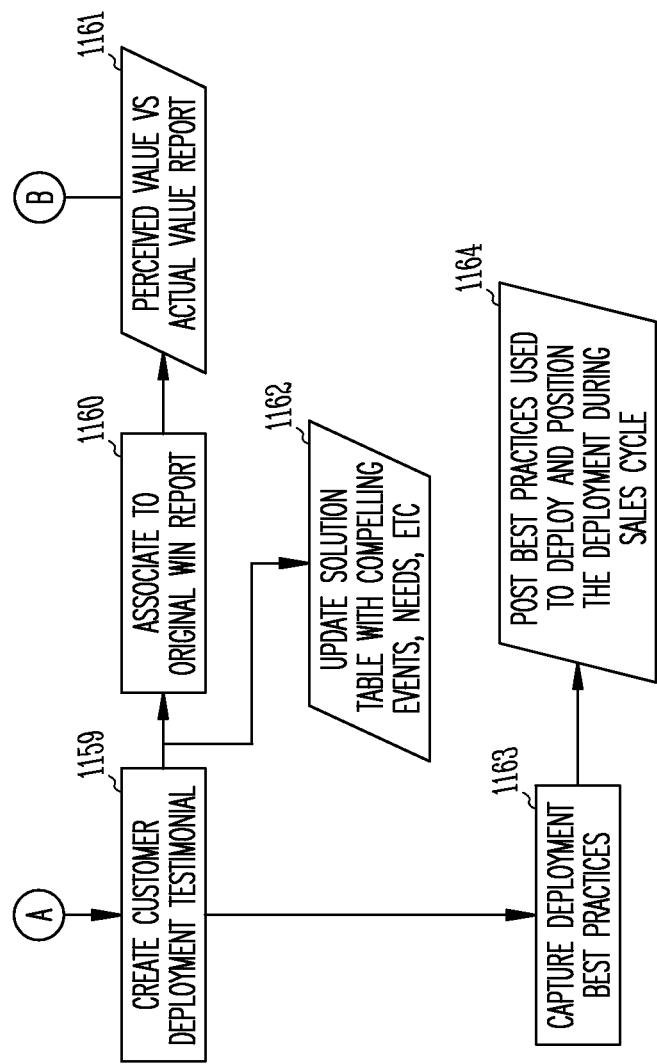

FIGS. 11A-B illustrate services effectiveness workflow, according to various embodiments. Reports (e.g. WIN Report and Statement of Work) from sales are reviewed at 1150, and learning about the customer through customer profile and need etc. occurs at 1151 and solutions, etc. are reviewed at 1152. With reference to 1153 and 1154, a perceived value proposition letter is sent. A pre-service call 1155 provides packaged and distributed service content including perceived value statement, and a service value statement is created 1156. The service work is performed 1157, and portal (private website) is updated with service collateral 1158. A customer testimonial is created 1159, and is associated with WIN report 1160 created by sales. A perceived value versus actual value report 1161 can be generated and posted on the website 1158. Solution tables are updated 1162 with information gleaned from customer testimonial. Best practices are captured at 1163, and posted 1164 for use during sales cycle.

Best Practices and Analytics

Very little is known about the effectiveness of multi-million dollar marketing campaigns, new sales collateral, and product and sales training. It tends to be a "one way street" with corporate providing collateral to the field, however the field rarely reciprocates or provides input on its usefulness. This is especially true of geographically distributed companies. Problems with conventional sales include the lack of analytics to understand usage of collateral, the inability to prioritize based on field usage and to rate and comment on the content, and the inability to share best practices. Because of these problems, content is not updated and developed based on field usage. Revenue is lost since the top needs of the field are not addressed. Additionally, content does not evolve based on field usage, and best practices used in the field are lost. Real-time analytics becomes a reality with a central repository accessed by all staff and customers.

The present subject matter provides a content management repository, which enables collaboration across the enterprise, one consistent message across all sales channels, the use of Internet and existing messaging technologies, and just in time training. Without a central knowledge base it is difficult if not impossible to maintain current content, capture/share best practices, and understand the effectiveness of the work performed to enable your staff. The present subject matter provides detailed metrics to help understand usage patterns, promote success, and rework as necessary to keep in touch with the ever changing needs of the market.

Content Repository

Some problems associated with enterprises involves the lack of collaboration due to many repositories and file structures. Additional problems include the lack of automation for workflow to effectively capture new content and feedback, outdated content, the inability to locate content or understand content, and content that doesn't address entire selling process. Because of these problems, resources are ineffectively utilized to "re-create the wheel," and best practices are lost preventing the ability to scale organization. Outdated content such as competitive document causes loss of credibility and revenue.

A central repository with detailed information about each document ensures that users can quickly find, refine, use, and share content. In various embodiments, the entire enterprise has access to central repository. Development, Product Management, Marketing, Sales, and Services join forces to deliver product and collateral that are aligned to needs of the customer. The present subject matter provides a vehicle to share best practices real time. Automated content maintenance workflow ensures current content is flowing daily. Reports can be automatically sent to owners of outdated content each day as expiration date is within certain date range. Metadata is used to categorize and identify content quickly via content index. Kits provide easy to find prepackaged content, and built-in analytics are able to identify usage. The present subject matter provides a vehicle to capture customer testimonials and product feedback from staff that is closest to the customer, and provides a platform to share best practices across a geographically distributed sales model.

Various embodiments of the present subject matter content management that enables a "self-cleaning" intranet. The content management serves to "prune" or "groom" intranet content over time by automatically removing and archiving both out-of-date and unused content. Out-of-date content is managed by giving all published content an expiration date. Several days prior to expiration, the content owner will be emailed and notified accordingly. The owner may wish to update and extend the content or simply allow it to be archived. Unused content is managed through the application of usage thresholds. If a piece of content is not being used by the field (failing to exceed a threshold of minimal unique hits), then the owner will be notified. In response to being notified that the published content has not met a usage threshold, the owner can either promote and extend the content, or allow the content to be archived. Archived content may be easily searched by users, but is removed from the main workspace of the system.

The system manager component is used to identify the thresholds for each organization to automate the pruning process. In various embodiments, the threshold include the number of days since last update, the expiration date, and the minimum usage level over a defined period of time. Reporting is provided to communicate with content managers the archive process and affected content.

Figure 12:
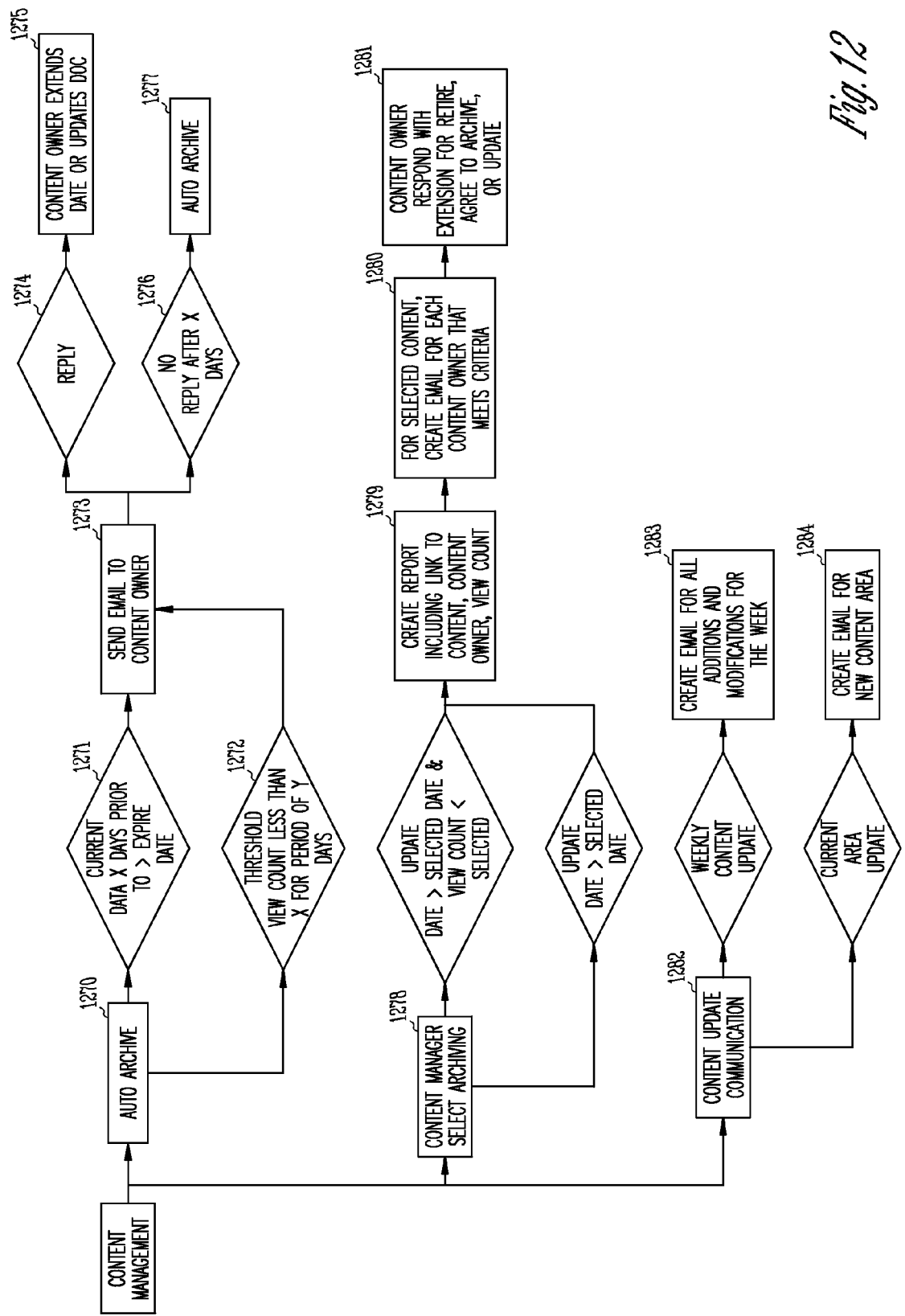
FIG. 12 illustrates a content management lifecycle process, according to various embodiments.

FIG. 12 illustrates a content management lifecycle process, according to various embodiments. An autoarchive process is illustrated beginning at 1270. Autoarchiving can occur if the current date is approaching an expiration date for the content 1271 or if the content usage is less than a threshold (e.g. x uses over y days) 1272. If either of these events occur, an email can be sent to the content owner 1273. The owner can reply 1274 by extending date or updating the content 1275. If the owner does not reply 1276, the content is archived automatically 1277. A content manager can select to archive content 1278 if the update data is greater than a selected date. A report is generated 1279 including a link to the content, the owner, and the view count. Owners of selected content are sent an email 1280, and the content owner responds 1281 by extending time before retirement, agreeing to archive, or updating. A communication can be sent when content is updated 1281. An email can be created to include all additions or modifications for a time period (e.g. a week) 1282 or to create email based on content area 1283.

System Components and User Tasks

Embodiments of the present subject matter conform to the discrete needs and goals of the organization, using prepackaged templates developed for various industry verticals and using examples to ensure a quick implementation, using a fully-automated content management process to drive new content and refine current content based on actual usage.

Administration/System Manager

This component is used to define the site to adhere to any sales process, all content types, and tool kits. A system manager interface is illustrated at 124 in FIG. 1. A step-type-step wizard enables quick setup. The component is used to setup and configure the intelligence center. The goal is to enable a new customer to quickly configure all aspects of the intelligence center. The system is designed to support any type of company and product. Thus, the intelligence center is table driven allowing the system manager to configure based on their discrete needs.

According to various embodiments, configuring the intelligence center includes installing the intelligence center to support a small or large geographically distributed organization; assessing all organization processes (e.g. a revenue enablement lifecycle); taking inventory of content (e.g. marketing, sales, service and other content that supports the sale and service of the companies products); and loading the company processes to serve as an outline and structure for the content and load the actual content. It is a goal to enable an organization to perform these steps quickly and easily without application development (i.e. without any changes to the program code or database). If the organization is fairly mature with existing processes and content, a new customer can install in minutes, configure in hours, and roll out to the enterprise in days. This is different from other sales effectiveness tools and related solutions such as CRM or PRM. If the organization is not mature with little or no process or content, then a process assessment quick-start consulting package can be used. The deployment requirement of install in minutes and configures in hours doesn't take into consideration content development. For organizations that require work in this area, the intelligence center offers a content template library to expedite the creation of consistent content.

Some management tasks include, for example, the following tasks:

Create/Modify Product Information, including product families, pricing, description and all other date contained in the product table.

Create/Modify Content Types, including examples and standard templates and other information contained in the content table. Templates and examples are used for online coaching and serve as the starting point for content types included by the kit builder such as sales enablement kit, solution kit, etc.

Create/Modify Sales Process, which loads the methodology database tables.

Create/Modify Associated Tools such as CRM or other productivity tools.

Setup Email Connection, which provides details on what email system (e.g. MS Exchange) is used for messaging.

Create/Modify Competitors, including competitor information used by sales wizard, win/loss catalog, and competitor quick view. The competitor table is loaded.

Create/Modify Industry Type, which is used by sales wizard, solution wizard, and win/loss catalog. An example set of industry come with the product. For example, banking, insurance, technology, healthcare, government, etc.

Create Methodologies, which can be used to capture any type of process. For example, Create Methodologies can be used to convey business process online for training, and sales steps used by sales wizard.

Create/Modify Kit Types, where a kit type provides a method of categorizing content can be used by new product release process for sales enablement kits, solution kits, PBS kits, etc.

Create/Modify Proposal Templates, which can be used for proposals and pricing.

User Access Setup to determine access to components and content. For example partners may see a filtered view of content that applies to specific products.

User Audience Setup, which can be used to categorize content for the different types of users such as sales and technical sales. This is also used for new content communication to target specific audiences for changes in content.

Identify Database, which can be used to determine what type of database backend used, such as SQL Server and MS Access, for example. Offline search capabilities can be provided.

Configure Menu Items, which provides the ability to hide any of the standard menu items Update Ownership, which provides the ability to change the ownership for one or many documents or other content.

Merge Content Type, which reassigns content ownership for entire repository.

Upload Company Global Address Book, which can be used for content distribution and to track content usage by customer.

Setup Kit Templates, which can be used to create types of kits and associate all content types that apply, and to map content templates and examples.

Setup Departments, which can be used to load the department types used to categorize content. Examples of departments include marketing, sales, services, and the like. A base set of departments can be provided.

Load Sales Channels, which can be used to filter content by user type, such as direct field and tele sales, partner sales. When launching new products or simply adding a document, the groups having access to the content are identified.

Setup Fulfillment, which includes loading the information used to create email to fulfillment center.

Configure User Interface, which includes changing the look and feel and menu items.

Setup Divisions, which includes optional information used to categorize content by business units or divisions such as business units or subsidiaries.

Management also includes analytics and corresponding reporting tasks. Some analytics tasks include: Setup Kit Templates used to create types of kits and associate all content types the apply. Also, map content templates and examples; Setup Departments used to load the department types used to categorize content into departments such as marketing, sales, services, etc.; Load Sales Channels used to filter content by user type such as direct field and tele sales, and partner sales; Setup Fulfillment used to load the information used to create email to fulfillment center; Configure User Interface used to change the look and feel and menu items; and Setup Divisions used to optionally categorize content by business units or divisions.

The Analytics user interface, illustrated at 121 in FIG. 1, is intuitive and flexible to support the multiple task scenarios that apply. An embodiment of a user interface includes buttons categorized by System Setup and Content Setup. System Setup buttons can include, for example, an online tutorial, an email setup, a user access setup, a database setup, configure tools and configure menu. Content Setup button can include, for example, configure content, content maintenance, process creation, configure kits, and reporting. Content can be created by selecting search criteria, and updating system data tables. The search results can be sorted by most used, date, name and rating.

Content Engine

This component is used to review, approve and maintain content. The content engine can be used by product management, marketing, sales training, and the like. The content engine drives the entire content management process, including reviewing and publishing new content and maintaining existing content. The intelligence center of the present subject matter allows every user to not simply use but also submit new content to the repository. In addition, using the kit builder facility the intelligence center provides an environment where user's can collaborate on new content prior to being formally published.

Some content manager tasks include the following tasks:

Kit Builder Creation, which is used to drive the creation and ongoing maintenance of logical groupings of content. Examples of kit types include sales kits, solution kits, and program based selling kits. Each company has the ability to create unique kit types and associate a standard set of documents which serve as templates.

What's New Email Creation, which provides an itemized list of the changes for a date range, such as one week. The list is formatted to be delivered in email ready message along with hyper links to direct the user to the content.

New Content By Audience Email Creation, which provides an itemized list of the changes for a date range using audience type category.

Review/Approve/Publish Content, which sends an email to content managers with the details and link to new content. The content managers can subscribe to publishing different content by product. This includes updates as well as new content.

Create Custom Page Editor, which provides a "what you see is what you get" text editor to modify pages.

Update Content View, which provides a listing view used to update all metadata

Multiple Content Delete, which provides the ability to select multiple docs for deletion. List view with shift select.

Multiple Content Archive, which can be used to transfer content from active doc database to archive database Archive Content Index Restoration, which can use content index search to connect to archive database with ability to restore archived content Create Methodologies, which provides the ability to generate a company process and post to company process content. Examples include product release process, content submit and publish process, and the like. If the method templates are purchase, upload process directly to site.

The content engine includes the Kit Builder facility, whose benefits include collaboration, collateral standards, and scalability. A kit is managed by a kit owner who is responsible for managing the kit, and working with others to create documents that go into the kit. The Kit Builder provides a central collaboration workspace, which can be used to work with others to create documents for the kit.

With respect to collateral standards, a default collateral set can be created for each kit type to provide for standard documents across kits. With respect to scalability, the Kit Builder can be used by various business groups to provide kits organized around product. Kits can easily be created when new Product Families or Products are introduced. An example of a kit builder process includes creating a new kit and determining from a default list of collateral types those that are going to be included in the new kit, assigning ownership of collateral types to specific users, associating documents to the collateral types in the kit, reviewing the associated documents and update to complete, and publishing the kit.

According to an embodiment, both content manager and system manager can have the ability to create kits. Only a user of one of the components (User, Content Manager, etc.) can gain access a kit in development. Upon creation, the content or system manager identifies the users who have access to the kit. A licensed copy is required to access a kit. A content manager can email a document contained in a kit. Individuals that have access to kits can only review the details about the kit and documents, and access the docs attached to a kit, but cannot remove or add documents to kit. Various embodiments use a spreadsheet and various embodiments use a tree view such that a user is able to sort on a product folder to see all kits associated with the product. For example, there may be a customer, sales, and service kit for a release. In fact because there are multiple versions, there may be multiple versions of a sales kit per version. According to various embodiments, the templates are files. Each of the kits will have a set of files. There are default kits that can be customized by a content manager or system manager. In addition, new kits with templates can be added.

Various embodiments provide Sales Kits, Customer Kits, and Service Kits as default kits. The following provides the content types for each of these three kits, which can function as default kits, according to various embodiments. Some embodiments of Sales Kits include various combinations of Sales Guides; Sales Cheat Sheets; Competitive Review (optional); Competitive Cheat Sheets; Price Schedule; Data & Solution Kits; Customer Stories; Evaluation Guide (optional); Customer Presentation; Email Template; Qualification Call Scripts; Return on Investment Cheat Sheets; What's New; and Internal Training Some embodiments of Customer Kits include Competitive Review (version approved for external distribution); Price Schedule; Data & Solution Kits; Customer Story; Evaluation Guide; Customer Presentation; Return on investment Cheat Sheets; What's New. Some embodiments of Service Kits include Customer Stories; Customer Training; Frequently Asked Questions (FAQ); Implementation Best Practices; and Implementation Success Stories (link to service win reports). The template files are managed by the content manager, and are not displayed to the user. Every document contained in the default kits can have a template.

The content engine, also referred to as a content manager, user interface is intuitive. An embodiment of a content engine interface includes buttons categorized by system setup and content setup. System Setup buttons can include, for example, an online tutorial, configure, custom pages, and reporting. Content Setup buttons can include, for example, content maintenance, publish content, process creation, kit builder, and update emails.

Intelligence Center

The intelligence center allows an end user to access content, and provides the end user with the ability to interact with content owners, share feedback, and submit new content. The intelligence center can be used by marketing, product management, sales, services and partners, for example.

Some intelligence center tasks include the following tasks:

Online Tutorial, which can be used by a new user to learn major functions and how to navigate through this component.

Request Access, which can be used to request access to site. An email with contents is sent to the system manager.

Locate Content, which can be used to locate content and then perform an action on what is selected. A simple three step process displaying the same metadata for each of the content searches can be used. In the first step, search criteria is selected. An optional second step sorts results by various criteria, such as by most used, last update date, document name, document rating and the like. A third step performs an actions, such as packaging content, downloading zip files, downloading to enable work offline, saving as favorite, adding to homepage, and including in private customer website.

Sales Effectiveness, which can be used to prepared to sell and adapt materials for a customer by learning about product, gathering references, and locating and packaging content.

JIT Training, which can be used to gain quick access to content that enables company staff and partner staff to learn about products and their value as they work with prospects and customers. JIT training can include online review and testing of knowledge for new product launches.

Create/Update Customer Profile, which can provide ability to save information about an account such as industry, business issues, and competition.

Create Customer Private Website, which can be based on content selected using content index, to create private website. Only documents that are identified as customer access can be posted to this site. Content such as NDA or internal only cannot be posted. This task is a menu driven way to build the website with the ability to change the banner (include RE.com as default), include company name, etc.

Templates for Customer Portal Generation, which can use a wizard to initially create portal page, then provide full edit capability for customer to modify. For example, text and links can be included on home page for top business issues addressed by proposed solution, decision criteria to link to any form of requirement document, related customer stories, projects that solution enables (compelling event), processes and tools that solution enables (for example, for a sale how does enable CRM product, product launch process, etc.), account next steps, meeting date, links to online trial of solution (link to online trial site), and customer contacts, including contacts for current customers, prospective customers, partners involved in evaluation or deployment.

Content Submission, which cam enable users to submit the content using configurable templates. Examples of such content include customer win/losses, customer testimonials, new documents and metadata, URL, field competitive intelligence, site feedback, miscellaneous generic template.

Provide Content Feedback, which can be used for documents selected from the content index to provide the ability to rate documents (e.g. 1-5 stars) and provide input and to send direct feedback to the owner.

Private Customer Site Analysis, which can provide analytics for all traffic for customer private websites. List all private websites sorted by most used.

Content New Flag, which can be used to flag content not accessed by user.

Save Favorites, which can be used to allow a user to save a query or kit page to their personal favorite page. When the document or kit is absolute, a visual indication is shown to either update if document has been removed or to update to latest release.

Upload Personal Address Book, which can be used to provide the user with the ability to upload their address book. This information is used for content distribution and tracking distribution by customer.

Distribution History, which can be used to track what documents have been sent to each customer. This information is shared with CRM to populate the activity record.

Search Wizard (wizards use a series of questions to locate and package content) can include a solution wizard, a product wizard, a sales call package, a services wizard, and a training wizard. The Solution Wizard can be used to locate and display company solutions. Initial display includes elevator pitch, company presentation, solutions presentation, product chalk talks. Content index with solution type and core competency. The Sales Call Package can be used to locate and package content for a sales call. Content index with sales step, competitor, industry, solution type. The Sales Call Package can also be used to search win/loss database. The Add Service Win wizard can be used to capture actual value delivered and capture best practices. Sets of electronic content can be saved to a binder for future reference. Search wizards navigate the content repository and display content in a meaning way.

This approach provides users of all levels with a quick way to located content in the context of the sales opportunity with prospects and service engagement with a customer. Some embodiments provide the ability to download, email, add to content cart, and/or save query to favorites.

Some examples of wizards are provided below. Those of ordinary skill in the art will understand, upon reading and comprehending this disclosure, how to develop other table-based wizards.

Solution Based Wizard

In a process to prepare to sell, according to an embodiment of a Solution Based Wizard, the wizard entry form asks: What solution(s) is the customer interested in? A solution selection box, including data from a solution type database table, permits the selection of one to multiple solutions. The wizard prompts a selection from the list of all document sales kits that match solution, all customer email templates that match solution, all call script content types that match solution, and all presentation content types that match solution. In the embodiment, the wizard entry form asks: What is the customer's industry? An industry selection box, including data from an industry table, allow the selection of at least one value from industry database table. The wizard prompts a selection from the list of all customer email templates that match solution, select all call scripts content types that match industry, select win reports that match the industry, select service win reports that match the industry, and select all data sheets for industry. In the embodiment, the wizard entry form asks: Is there a competitor? A competitor selection box, including data from a computer database table, allow the selection of at least one competitor. The wizard prompts a selection from the list of select all win reports that match competitor and select all competition content type docs for the competitor.

Only the selected fields are displayed. A displayed customer profile identifies solution(s), industry, and competitor(s). A text box is displayed, with the text: What to say to gain customer interest. Content matches for solution or industry are displayed. A text box is displayed with the text Email template to gain customer interest, including a button to copy email template to an email message. A text box is displayed, with the text: Customer references to gain customer interest. The wizard prompts a selection of win reports that match the industry, service win reports that match the industry, and/or all customer stories that match the industry. A text box is displayed, with the text: Brief product information to gain customer interest. The wizard prompts a selection of data and solution sheets. In a process to prepare the materials for selling, the wizard provides internal sales kits and prompts for a selection, and provides customer's kits for distribution to customer and customer kits for solution or industry. In a process to prepare to present the solution, the wizard provides presentation materials and prompts for a selection of content types for solution or industry. In a process to prepare the materials to compete, the wizard provides corporate and field competitive intelligence, and prompts for a selection of all win reports that match competitor and/or all competition content type docs for the competitor.

Product Based Wizard

In a process to prepare to sell, according to an embodiment of a Product Based Wizard, the wizard entry form asks: What is the customer's industry? An industry selection box, including data from an industry type database table, permits selection of an industry. The wizard prompts a selection from the list of all customer email templates that match industry, win reports that match the industry, and service win reports that match the industry. The wizard form asks: What product(s) is the customer interested in? A product selection box, including data from a product type database table, permits selection of one or more products. The wizard prompts a selection from the list of all sales kits that match the product selected, all customer email templates that match product, and all call script content type docs that match product. The wizard form asks: Is there a competitor? A competitor selection box, including data from a competitor type database table, permits selection of one or more competitors. The wizard prompts a selection from the list of all win reports that match competitor and all competition content type docs for the competitor.

Only the selected fields are displayed. A displayed opportunity profile identifies industry, product(s) and competitor(s). A text box is displayed, with the text: What to say to gain customer interest, and content matches for product or industry are displayed. A text box is displayed, with the text: Email template to gain customer interest, and content matches for product or industry are displayed. A text box is displayed, with the text: References to gain customer interest, and content matches of win reports and service win reports for product or industry are displayed. A text box is displayed, with the text: Inform and educate customer, and content matches of data and solution sheets for product or industry are displayed.

In a process to prepare the materials for selling, the wizard provides sales kits and customer kits for the solution or industry for use in education and distribution. In a process to prepare to present the solution, the wizard provides presentation materials for the solution or industry. In a process to prepare to compete, the wizard prompts for a selection of all win reports that match competitor or all competition content type docs for the competitor.

Packaging Content Wizard

This wizard provides collateral to be used on a sales call specific to the needs of the prospect. This is a quick way to package content to be distributed in either hardcopy or electronic format. According to an embodiment of a Packaging Content Wizard, the wizard entry form asks: What is the customer's industry? An industry selection box, including data from an industry type database table, permits selection of one or more industries. The wizard prompts a selection from the list of customer kits that match the industry. The wizard entry form asks: What solution or product is the customer interested in? A solution selection box, including data from a solution database table, permits selection of one or more solutions. The wizard prompts a selection from the list of customer kits that match the solution. The wizard entry form asks: Is there a competitor? A competitor selection box, including data from a competitor database table, permits selection of one or more competitors. The wizard prompts a selection from the list of all competition content type documents that are marked as "free to distribute" for the competitor.

A displayed package collateral query identifies an opportunity profile that includes industry, product(s) and competitor(s). A text box is displayed, with the text Customer kits to distribute or post to customer website, and matches of customer kits for the industry or solution are provided for selection. A text box is displayed, with the text Competitive Comparisons, and all competition content type docs that are marked as "free to distribute" for the competitor are provided for selection.

Service Powertool

This wizard provides best practices, training content, and win report details to prepare for a consulting and training engagement. According to an embodiment, the wizard entry form asks: What products has the customer purchased? A product selection box, including data from a product database table, permits selection of one or more products. The wizard prompts a selection from the list of all service win reports that match the product, all service kits that match the products, and all best practice content types that match the product. The wizard entry form asks: What solutions is the customer interested in deploying? A solutions selection box, including data from a solutions database table, permits selection of one or more solutions. The wizard prompts a selection from the list of document service kits that match solution and all best practice content type documents for solution.

A displayed package collateral query identifies a customer profile that includes product(s) purchased and solution(s). A text box is displayed, with the text Prepare to indicate preparation for engagement, and matches of are provided for selection of all service kits that match the products, customer training, and frequently asked questions. A text box is displayed, with the text Best Practices to indicate proven best practices for reuse, and matches are provided for selection of all best practice content types that match the product. A text box is displayed, with the text Customer Reference to indicate customer reference to endorse service, and matches are provided for selection of all service win reports that match the product and customer stories.

An embodiment of a user interface includes buttons, which can include, for example, Offline/Online Mode, Online Tutorial, My Solution/My Private Websites, What's New/Top Content, New Product Releases, Post Content, Customer Contacts, Sales Effectiveness, Customer Stories, Proposals, Sales Kits, Company Processes, CRM/SFA & Links, and Custom Pages. Content can be created by selecting search criteria, sorting results such as by most used, date, name, rating, etc., and packaging and acting on content. Examples of actions include emailing, sending to handheld devices, downloading zip files, downloading to work offline, saving as a favorite, adding to a homepage, including in customer versions of website, and sending email to fulfillment center. Thumbnails can be used to view documents.

Customer Enablement

Some customer tasks include:

Review Content as defined as the user enablement component. Content and metadata view cam be displayed from a customer perspective. Customer has the ability to view online, download, or send a link to content.

Email Link Content On Private Website, in which a user sends a link to one or more documents posted to their site.

Email Private Website URL, in which a user sends a URL and access code to customer's private site.

Submit New Content, where new content submitted by customer or user is placed in queue to be approved by the author of the private website Update Customer Business Issues to provide a form-driven way to capture and display the customer's top business issues.

Request Content Removal using an email sent to author of private site.

An embodiment of a user interface includes buttons, which can include, for example, buttons to email, download, send link and send URL.

Portal Developer

This component, illustrated at 123 in FIG. 1, is used by a customer to build custom web pages to review and download content, and to analyze the use of content. FIGS. 5-6 illustrate various portal creation embodiments.

Content Template Library

The content template library can be used by content managers. The library includes ready made templates with the outline of a business process. The library can include advanced templates, such as templates for sales enablement kits with an outline of a sales process. For companies with no or less mature processes, the content library templates, release process and sales process provide a jump start for deployment. Some content template tasks, include Sales Process Templates, which includes sales process, release to market process, deployment process, Sales Kit Templates, which includes a standard list of content types such as MS Word templates, and active deliverable to provide online guidance, Examples Kits, which includes sales kits and solution kits, and Example Sales Techniques, which includes industry standard techniques such as chalk talk.

Sales Methodology Templates

This component can be used by sales, as it includes pre-packaged sales methodology, including opportunity management approach and techniques. Other methodology templates can be developed for non-sales applications.

Analytics/Management Dashboard

This component, the interfaces of which are illustrated at 121/125 in FIG. 1, can be used by management, as it permits reporting to analyze and communicate data regarding content use and portal use. The analytics tracks usage, provides real business value in understanding direct and indirect sales staff product mindshare, customer product mindshare, customer buying interest for add-on and cross selling opportunity, what marketing initiatives are working or not working, what sales initiatives are working or not working, the effectiveness of the investment in sales enablement (methods, training, CRM, other tools), and the general health and maintenance of the repository.

Examples of Reports Include Reporting/Analytics and Drill Down Analysis.

Reporting/Analytics provides a list of static reports to include as part of a separate reporting tab. Each component has a reporting tab with access to different type of reports (sys manager, content manager, user). Reporting/Analytics provides ability to print, save to file, and export reports in MS Word or Excel format for further manipulation. Within the product, the ability is provided to view report online, save report to My Solution, or email the report. Drill Down Analysis provides the ability to sort metrics by target users (e.g. internal staff, partners, customers), by internal staff department (e.g. sales, product marketing, service, marketing), type of user audience (e.g. technical, non technical)

Mindshare provides a visitor analysis to provide an understanding of the mindshare for the usage or content across the entire user base. Visitor Session Overview analysis provides a graphic that shows a number of visitor session per day, per week and per month. Able to drill down as stated above from overall users, to groups to individual users. Visitor Session Time analysis provides average per day, per week or for a specified time period. Most Active Users analysis provide totals for user by audience with the ability to drill down on a user audience type and individual using drill down stated above. Least Active Users analysis provides totals for user by audience with the ability to drill down on a user audience type using drill down stated above. Geographic Usage analysis provides a graphic showing usage by country using visits metric. Able to drill down. Unique Visitor Visits analysis provides totals of unique visitors for time period, and is capable of distinguishing between repeat and one time visitors.

Performance reports provide activity statistics, which provides an understanding of the performance of the intelligence center, including files, pages, and other content. The metrics in this report serves as a great coaching tool for new staff trying to understand the top content areas of the intelligence center. Overall Site Hits, which provides a macro report for total hits per day, per week, per month, and average per business working day for a specified time period. Overall Page Views, which provides overall hits reports for page view impressions. Document Action Usage, which provides total documents viewed, emailed, downloaded, save to favorite, published to customer private website. Ability to drill down into specific documents is provided. Top 10 Report, which provides top 10 of pages requested, files requested, content types, win/loss reports. Bottom 10 Report, which provides bottom 10 of pages requested, files requested, content types, win/loss reports. Top Usage Day, which provides top usage day by number of visits, files accessed, and time. Top Customer Portal Usage, which provides top customer portals by number of visits and page hits. Usage Time, which provides top usage time during the course of a day determined by number of visits, files accessed, and time spent. Top Pages, which reviews top pages, and allows ability to drill into what audience accesses in each page. Top Documents, which reviews the top files accessed, and provides ability to drill into count for files viewed online, download, email, posted to customer web, feedback to author, added to favorites. Top Entry page and exit page, which identifies entry and exit page for session. Top keywords, which provides top keywords used to find content. Top products, which provides top products used to locate content. Top content types, which provides top content types used to locate content. Top methodology steps, which provides top methodology step used to locate content. Top industry, which provides the top industries used by search wizard. Top solutions, which provides the top solutions used by search wizard. Top competitors, which provides the top competitor used by search wizard. Customer Portal resources, which provides top products posted, top documents posted, top kits posted, and the like. Top References Requested, which provides references from the win/loss analysis, list top competitors, products, industry requested. Content Dashboard, which provides the total products, total competitors, total content types, kit types, solution types, and win/loss reports.

Maintenance System Setup provides information to maintain the intelligence center. A User Usage List provides a list of users that include: user name, last accessed date, user audience, department, setup date, content authored count, average time spent on site, files accessed. The list can be sorted by last accessed date. An Industry Usage List provides an industry name, description, number of associations to win/loss reports. A Content Usage Types provides a type name, description, flag for template and example including the file name for each, number of associations to documents. A Product Usage List provides a listing of products, owner, version, sales channels (audience that have access to product's content), number of associations to documents, docs posted to MY Solution pages, and win/loss reports. A Competitor List provides a list of competitors, number of associations to wins/loss reports.

Content Maintenance provides information to communicate availability of content and ongoing content maintenance. What's New provides a HTML format report to drop into email to announce updates. This includes new content and updated content. Metadata includes document title, update date, author, and description. The content manager is allowed to set what metadata to include. Ability is provided to create different what new reports based on target audience such as internal staff, partners and customers. Total Documents Per Content Type provides a total of each content type. Content Publishing provides content management metrics for total documents: submitted, published, archived, deleted. Also, metrics can be provided for total win/loss reports published, updated, deleted. Win/Loss provides total win/losses, total by industry, total by competitor, and total by product. Author Maintenance Report provides a listing of users that have created content, date posted, retire date, rating, view count. Listing can be sorted by audience, department, or user. Enable the report to be emailed to content authors with embedded links to launch content directly for maintenance and re-publishing. Content Department Ownership provides totals for content owned by department. Archive Content, which provides a list that is older than specified date range. For example, all content that is 12 months or older. Provide ability to sort by owner, owning division, department, product. Similar to author maintenance report, enable report to be emailed to author. Content Department Ownership provides totals for content owned by department. Archive Content provides a list content that is older than specified date range (e.g. content that is 12 months or older). Ability is provided to sort by owner, owning division, department, product. Report can be emailed to author. Unused Content provides a list of content with access view count less than specified number. Emails are auto generated by the repository based on thresholds established by content managers. Content Archive Reporting provides a list of content archived based on auto archive criteria set by system management. Kit Report provides a list of kits with product name, product version, publish date, total hits, owner. A pie chart can be provided with a breakdown of different kit types. Customer Portal Maintenance Total number of portals sort by industry, list of customer portals, owner, date created, last accessed, industry, customer contact email address, last update date, and view count. Based on visits threshold, report can be generated to provide customer portal deletion notice to portal owner.

Individual Reporting provides user reporting to drive effective use of content. A Solution tab provides a general user content dashboard, which provide overview metrics with totals for: total documents, viewed documents by user, win/loss reports submitted by user, customer portals generated by user, and total documents submitted and published. The Solution tab further provides a document distribution history, which tracks what documents have been sent for each customer. This information is shared with CRM to populate the activity record. The Solution tab further provides content accessed, which includes a list of content accessed and not accessed per user. The Solution tab further provides my top kits, which includes top accessed kits. The Solution tab further provides my top wins, which includes top accessed win/loss reports. The Solution tab further provides my top documents, which includes top accessed documents.

My Portal Reports are used to track prospects and customers buying behavior. All Customer Portals Usage Metrics provide customer portals reporting for all portals owned by the user, including total user visits, total duration of visits, total docs viewed/downloaded, total visits by day. Customer Usage provide data on one specific customer portal, including details for access to following resources, user, time spent on site, docs, kits, pages, products. Also, time on site, record for each email address are used. Customer Content Posting includes a list of all content posted for each portal. The content includes metadata, such as document title, date, and posted by data. Customer Portal Opportunity Report includes all data contained on the home page of the customer portal including top business issues, decision criteria, next meeting, contact name, compelling event or project enabled and title of related customer stories. Top Content includes content used by top 20% (or other percentage by way of configuration using the content manager) of representations. The content includes top kits, documents and win reports.

Technical Statistics provides information to improve technical performance. Top referring sites, MS Explorer version (or other browser), platform, listing of failed login attempts, and failed file access can be reported.

Management Dashboard

A management dashboard is a standalone reporting component to understand the usage patterns and business analytics. No other component is required. Dashboard tasks include Kit Training Reporting, to provide reporting for individuals that have reviewed specific modules, Product Release Content Communication to send email with an outline of product release and new content available to enable the individual, and other types of reports such as Mindshare, Educational Reports, and Solution Performance.

CRM and Other Tool Integration

Customer Relationship Management (CRM), and Partner Relationship Management (PRM) markets have developed over the past 10 years with annual revenue growth between 20-30%. These applications focus on the customer, improving customer acquisition and retention. While these applications have automated the sales process, improved the efficiency of customer service, and centralized key customer information, they continue to lack methods for information dissemination and feedback. Training and feedback can be used to ensure the sales and service channels are certified, and that customers, partners and resellers have a process for providing feedback about products and services.

The intelligence center adds a CRM application programming interface (API) or using Microsoft.net to exchange information. Integration with a CRM/SFA software platform allows users of the intelligence center to interact with, and leverage data that exist within the CRM application and vice versa. The data may include contact information, collateral distribution information, account information, account history, log information, and so forth. Some aspects of the integration, however, are specific to the targeted CRM application. For example, some embodiments pass email address and email function from Microsoft Outlook or CRM to the intelligence center and/or to web portal generation. Some embodiments pass collateral distribution information from the intelligence center to a CRM to associate account content.

Content from an existing repository can be moved into the intelligence center using a CSV import mechanism to provide an easy way to publish several content items at once keeping existing content in use, without redundancy or programming. Content can be shared between the intelligence center and an existing content management system or portal using XML-based content-sharing API. Content can be published once, and delivered to multiple destinations (for example: Plumtree, Vignette, Interwoven, IcSolution), or published where convenient and synchronize content between systems. Various embodiments integrate with Microsoft Customer Relationship Management (CRM).

This disclosure refers to several figures that resemble flow diagrams. One of ordinary skill in the art will understand, upon reading and comprehending this disclosure, that the methods related to the flow diagrams may occur in the order as illustrated in the flow diagrams, and may be ordered in another manner. Thus, the present subject matter is not limited to a particular order or logical arrangement.

Although specific embodiments have been illustrated and described herein, it will be appreciated by those of ordinary skill in the art that any arrangement which is calculated to achieve the same purpose may be substituted for the specific embodiments shown. This application is intended to cover adaptations or variations of the present subject matter. It is to be understood that the above description is intended to be illustrative, and not restrictive. Combinations of the above embodiments, portions of the above embodiments and other embodiments, will be apparent to those of skill in the art upon reviewing the above description. The scope of the present subject matter should be determined with reference to the appended claims, along with the full scope of equivalents to which such claims are entitled.

What is claimed is:

1. A system comprising:
   a receiving module configured for receiving a user selection of a portal visitor type to create a customizable portal associated with a business organization, wherein the portal visitor type identifies users that can access the customizable portal, wherein the portal visitor type is associated with a department of the business organization;
   a means for determining content associated with an industry type, wherein the industry type is associated with the portal visitor type and with the department of the business organization and configured for providing the determined content for user selection thereof; and a portal module configured for creating the customizable portal, wherein the customizable portal is configured to be packaged, wherein the customizable portal is based on the selected content, the portal visitor type, the department of the business organization and the industry type, and wherein the customizable portal is configured for automatic archiving based on a group consisting of an expiration date and a content usage threshold associated with the department.

2. The system of claim 1, wherein the determined content is provided further based on a group consisting of business practices of the business organization, offerings by the business organization, competitors of the business organization, and the industry type being associated with the selected portal visitor type.

3. The system of claim 1 further comprising:
a graphical extraction module configured for extracting graphical representation information from an existing website associated with the business organization, wherein the portal module is configured for customizing the customizable portal based on the graphical representation information.

4. The system of claim 3, wherein the graphical representation information includes font type, font size, color, images, business logo, and graphical buttons.

5. The system of claim 1 further comprising:
a user module configured for identifying users with privileges to create the customizable portal.

6. The system of claim 1 further comprising:
a report module configured for customizing analytic reports to generate real-time analytic reports regarding user interactions with the customizable portal.

7. The system of claim 1 further comprising:
a data module configured for associating the expiration date with the selected content in the customizable portal; and
an alert module configured for generating an alert message, regarding the expiration date, to an owner of the customizable portal within a specified time period prior to the expiration date.

8. The system of claim 1 further comprising:
an alert module configured for generating an alert message to an owner of the customizable portal or archiving the selected content in response to a content usage being less than a certain threshold.

9. A system comprising:
a receiving module configured for receiving a user selection of a portal visitor type to create a portal associated with a business organization, wherein the portal visitor type identifies users that can access the portal, wherein the portal visitor type is associated with a department of the business organization;
a means for determining content associated with an industry type, wherein the industry type is associated with the portal visitor type and with the department of the business organization and configured for providing the determined content for user selection thereof;
an extraction module configured for automatically extracting graphical representation information from an existing website associated with the business organization, wherein the extracting is associated with the portal visitor type;
a portal module configured for creating the portal and customizing the portal, wherein the portal is configured to be packaged, wherein the portal is based on the selected content, the portal visitor type, the department of the business organization, the industry type, and the graphical representation information, and wherein the customizable portal is configured for automatic archiving based on a group consisting of an expiration date and a content usage threshold associated with the department; and
a report module configured for subsequent to customizing, generating real-time analytic reports regarding user interactions with the portal.

10. The system of claim 9, wherein creating the portal includes:
a user module configured for identifying portal users that have privileges to customize the portal.

11. The system of claim 9, wherein the content is provided further based on a group consisting of business practices of the business organization, offerings by the business organization, competitors of the business organization, and the industry type being associated with the selected portal visitor type.

12. The system of claim 9 further comprising:
an alert module configured for generating an alert message, regarding the expiration date of portal content, to an owner of the portal within a specified time period prior to the expiration date.

13. The system of claim 9 further comprising:
an alert module configured for generating an alert message to an owner of the portal or archiving the portal content in response to a content usage of portal content being less than a certain threshold.

* * * * *